(12) United States Patent
Kazeoka

(10) Patent No.: US 9,153,140 B2
(45) Date of Patent: Oct. 6, 2015

(54) ELECTRONIC DEVICE, CONTROL PROGRAM, RECORDING MEDIUM, AND CONTROL METHOD

(75) Inventor: Susumu Kazeoka, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 672 days.

(21) Appl. No.: 12/742,681

(22) PCT Filed: Nov. 12, 2008

(86) PCT No.: PCT/JP2008/070569
§ 371 (c)(1),
(2), (4) Date: May 13, 2010

(87) PCT Pub. No.: WO2009/063893
PCT Pub. Date: May 22, 2009

(65) Prior Publication Data
US 2010/0268730 A1 Oct. 21, 2010

(30) Foreign Application Priority Data

Nov. 14, 2007 (JP) ................. 2007-295558

(51) Int. Cl.
*G06F 17/30* (2006.01)
*G09B 5/00* (2006.01)
*G09B 7/00* (2006.01)
*G09B 19/06* (2006.01)
*H04N 9/82* (2006.01)
*G06F 17/28* (2006.01)
*H04N 21/462* (2011.01)

(52) U.S. Cl.
CPC ............... *G09B 5/00* (2013.01); *G06F 17/289* (2013.01); *G06F 17/30017* (2013.01); *G06F 17/30817* (2013.01); *G09B 7/00* (2013.01); *G09B 19/06* (2013.01); *H04N 9/8205* (2013.01); *H04N 21/4622* (2013.01)

(58) Field of Classification Search
USPC .......................................... 707/772
See application file for complete search history.

(56) References Cited

U.S. PATENT DOCUMENTS

| 654,913 A | 7/1900 | McIlwraith |
| 4,695,975 A * | 9/1987 | Bedrij ........................... 715/202 |
| 2003/0039469 A1 | 2/2003 | Kim |

(Continued)

FOREIGN PATENT DOCUMENTS

| EP | 1 818 838 A1 | 8/2007 |
| JP | 58-114166 A | 7/1983 |
| JP | 7-295466 A | 11/1995 |
| JP | 9-294253 A | 11/1997 |
| JP | 11-84997 A | 3/1999 |

(Continued)

*Primary Examiner* — Robert Beausoliel, Jr.
*Assistant Examiner* — Nirav K Khakhar
(74) *Attorney, Agent, or Firm* — Birch, Stewart, Kolasch & Birch, LLP

(57) ABSTRACT

Provided are an electronic device, a control program, a recording medium, and a control method that enable a user to efficiently learn a word to be learned. If search processing for searching for detailed information of a headword based on a received input is performed while an image is being displayed, the electronic device causes the headword corresponding to the detailed information searched for by the search processing and image information identifying the image being displayed to be stored in an associated manner. When the image identified by the image information is displayed, the electronic device causes the headword associated with the image information to be further displayed.

10 Claims, 24 Drawing Sheets

(56) References Cited

U.S. PATENT DOCUMENTS

| | | | |
|---|---|---|---|
| 2003/0122860 A1* | 7/2003 | Ino | 345/716 |
| 2007/0073776 A1* | 3/2007 | Kalalian et al. | 707/104.1 |
| 2007/0150453 A1 | 6/2007 | Morita | |
| 2008/0065384 A1 | 3/2008 | Kikuchi | |

FOREIGN PATENT DOCUMENTS

| | | |
|---|---|---|
| JP | 2003-316245 A | 11/2003 |
| JP | 2004-151292 A | 5/2004 |
| JP | 2004-215094 A | 7/2004 |
| JP | 2007-79745 A | 3/2007 |

* cited by examiner

| TITLE | HEADWORD | INFORMATION ACQUISITION SOURCE | SEARCHED INFORMATION DISPLAY TIME |
|---|---|---|---|
| ENGLISH CONVERSATION COURSE AA | sleep | ENGLISH-JAPANESE A | 8 MINUTES 22 SECONDS |

| TITLE | INFORMATION ACQUISITION SOURCE |
|---|---|
| ENGLISH CONVERSATION COURSE AA | ENGLISH-JAPANESE A |

| TITLE | HEADWORD | INFORMATION ACQUISITION SOURCE | SEARCHED INFORMATION DISPLAY TIME |
|---|---|---|---|
| ENGLISH CONVERSATION COURSE AA | sleep | ENGLISH-JAPANESE A | 8 MINUTES 22 SECONDS |
| | meet | ENGLISH-JAPANESE B | 24 MINUTES 12 SECONDS |
| | ⋮ | ⋮ | ⋮ |
| | memory | http://www.cc.com/ | 26 MINUTES 12 SECONDS |

| TITLE | INFORMATION ACQUISITION SOURCE |
|---|---|
| ENGLISH CONVERSATION COURSE AA | ENGLISH-JAPANESE A |
| | ENGLISH-JAPANESE B |
| | ⋮ |
| | http://www.cc.com/ |

FIG.11

| TITLE | HEADWORD | INFORMATION ACQUISITION SOURCE | SEARCHED INFORMATION DISPLAY TIME | REPRODUCTION TIME (MINUTES) |
|---|---|---|---|---|
| ENGLISH CONVERSATION COURSE AA | sleep | ENGLISH-JAPANESE A | 8 MINUTES 22 SECONDS | 30 |
| | meet | ENGLISH-JAPANESE B | 24 MINUTES 12 SECONDS | |
| | ... | ... | ... | |
| | memory | http://www.cc.com/ | 26 MINUTES 12 SECONDS | |

LIST OF RECORDED IMAGES

| No. | TITLE |
|---|---|
| 1 | ENGLISH CONVERSATION COURSE AA |
| 2 | CHINESE COURSE BB |
| 3 | FRENCH COURSE CC |
| ⋮ | ⋮ |

FIG.19

| TITLE | HEADWORD | INFORMATION ACQUISITION SOURCE | SEARCHED INFORMATION DISPLAY TIME | REPRODUCTION TIME (MINUTES) |
|---|---|---|---|---|
| ENGLISH CONVERSATION COURSE AA | sleep | ENGLISH-JAPANESE A | 8 MINUTES 22 SECONDS | 30 |
| | come | ENGLISH-JAPANESE D | 16 MINUTES 50 SECONDS | |
| | meet | ENGLISH-JAPANESE B | 24 MINUTES 12 SECONDS | |
| | ... | ... | ... | |
| | memory | http://www.cc.com/ | 26 MINUTES 12 SECONDS | |

D100C

D110C

| TITLE | INFORMATION ACQUISITION SOURCE |
|---|---|
| ENGLISH CONVERSATION COURSE AA | ENGLISH-JAPANESE A |
| | ENGLISH-JAPANESE B |
| | ⋮ |
| | http://www.cc.com/ |
| | ENGLISH-JAPANESE D |

FIG.22

| | | MG400 |
|---|---|---|
| LIST | | |
| | | MG410 |
| 0 | ALL HEADWORDS | |
| 1 | ENGLISH CONVERSATION COURSE AA | |
| 2 | CHINESE COURSE BB | |
| 3 | FRENCH COURSE CC | |
| ⋮ | ⋮ | |

FIG.24

ALL HEADWORDS — MG400B / MG410B

| No. | HEADWORD |
|---|---|
| 1 | taberu |
| 2 | hanasu |
| 3 | sleep |
| 4 | come |
| ⋮ | ⋮ |

ELECTRONIC DEVICE, CONTROL PROGRAM, RECORDING MEDIUM, AND CONTROL METHOD

TECHNICAL FIELD

The present invention relates to an electronic device, a control program, a recording medium, and a control method, and in particular to an electronic device, a control program, a recording medium, and a control method performing processing for reproducing a content.

BACKGROUND ART

In recent years, in various apparatuses having a function of recording an image of a video content such as a television (TV) broadcast program (hereinafter also referred to as image-recording/reproduction apparatuses), a function of searching for and displaying various information is being incorporated. Therefore, a number of techniques for searching for various information have been conventionally disclosed.

For example, Japanese Patent Laying-Open No. 09-294253 (Patent Document 1) discloses a technique for searching for supplementary information on a broadcast program being viewed by a user.

Further, Japanese Patent Laying-Open No. 2004-215094 (Patent Document 2) discloses a technique for extracting information on the contents of TV broadcast and searching for information on the TV broadcast utilizing the extracted information.

Patent Document 1: Japanese Patent Laying-Open No. 09-294253
Patent Document 2: Japanese Patent Laying-Open No. 2004-215094

DISCLOSURE OF THE INVENTION

Problems to be Solved by the Invention

The more a user searches for various information, the more the user encounters a word whose meaning is unknown to the user (hereinafter also referred to as an unknown word). When the user encounters an unknown word, the user can learn the meaning of the unknown word only after he or she for example performs an operation of inputting the unknown word into a translation apparatus such as an electronic dictionary. Generally, humans learn an unknown word by repeatedly encountering the unknown word. Therefore, to learn an unknown word, a user has to write down a content (for example, a web page, a TV broadcast program, or the like) in which he or she has encountered the unknown word, for example on a sheet of paper or the like, which has been inefficient.

The present invention has been made to solve the problem described above, and one object of the present invention is to provide an electronic device, a control program, a recording medium, and a control method capable of helping a user efficiently learn a word to be learned.

Means for Solving the Problems

To solve the problem described above, an electronic device in accordance with an aspect of the present invention includes: a reception unit receiving an input; a search unit performing search processing for searching for detailed information of a headword based on the input received by the reception unit; a display unit displaying an image; a storage unit storing information; a containing unit performing storage processing if the search processing is performed by the search unit while the display unit is displaying the image, the storage processing causing the storage unit to store the headword corresponding to the detailed information searched for by the search processing and image information identifying the image being displayed by the display unit in an associated manner; and a display control unit causing the display unit, when the display unit displays the image identified by the image information stored in the storage unit, to further display the headword associated with the image information.

Preferably, the storage unit stores a plurality of detailed information respectively associated with a plurality of headwords, and the search unit searches the plurality of detailed information stored in the storage unit for the detailed information associated with the headword based on the input received by the reception unit.

Preferably, the electronic device further includes a communication unit performing data communication with a network. The search unit searches the network for the detailed information of the headword based on the input received by the reception unit, utilizing the communication unit.

Preferably, the display control unit causes the display unit to display the detailed information searched for by the search processing. When performing the storage processing, the containing unit further causes the storage unit to store searched information display time and the image information in an associated manner, the searched information display time being time at which the detailed information searched for by the search processing is displayed by the display unit. The electronic device further includes a measurement unit measuring, when the display unit displays the image identified by the image information stored in the storage unit, elapsed time that has elapsed since the display unit displays the image identified by the image information. If the elapsed time being measured by the measurement unit reaches time satisfying a predetermined time condition, the display control unit causes the display unit to display the headword associated with the image information.

Preferably, the time satisfying a predetermined time condition is time within a predetermined period including the searched information display time stored in the storage unit.

Preferably, when causing the display unit to display the headword, the display control unit also causes the display unit to display information for identifying a source for acquiring the detailed information of the headword caused to be displayed on the display unit.

Preferably, the detailed information searched for by the search processing is any of meaning, explanation, and a translated word of the corresponding headword.

According to another aspect of the present invention, a control program for an electronic device including a display unit displaying an image and a storage unit storing information causes the electronic device to perform the steps of: receiving an input; performing search processing for searching for detailed information of a headword based on the received input; performing storage processing if the search processing is performed while the display unit is displaying the image, the storage processing causing the storage unit to store the headword corresponding to the detailed information searched for by the search processing and image information identifying the image being displayed by the display unit in an associated manner; and causing the display unit, when the display unit displays the image identified by the image information stored in the storage unit, to further display the headword associated with the image information.

A recording medium in accordance with still another aspect of the present invention is a computer-readable medium recording a control program.

According to still another aspect of the present invention, a control method for an electronic device including a display unit displaying an image and a storage unit storing information includes the steps of: receiving an input; performing search processing for searching for detailed information of a headword based on the received input; performing storage processing if the search processing is performed while the display unit is displaying the image, the storage processing causing the storage unit to store the headword corresponding to the detailed information searched for by the search processing and image information identifying the image being displayed by the display unit in an associated manner; and causing the display unit, when the display unit displays the image identified by the image information stored in the storage unit, to further display the headword associated with the image information.

Effects of the Invention

If search processing for searching for detailed information of a headword based on a received input is performed while an image is being displayed, the electronic device in accordance with the present invention causes the headword corresponding to the detailed information searched for by the search processing and image information identifying the image being displayed to be stored in an associated manner. When the image identified by the image information is displayed, the electronic device causes the headword associated with the image information to be further displayed.

That is, when the image identified by the image information is displayed, the headword associated with the image information is displayed. The displayed headword is a headword based on the received input. Further, the displayed headword is a headword whose detailed information has been searched for. The headword whose detailed information has been searched for is a headword based on the received input, and a word to be learned by a user. Therefore, there is achieved an effect that allows the user to efficiently learn a word to be learned.

If search processing for searching for detailed information of a headword based on a received input is performed while an image is being displayed, the control program in accordance with the present invention causes the headword corresponding to the detailed information searched for by the search processing and image information identifying the image being displayed to be stored in an associated manner. When the image identified by the image information is displayed, the control program causes the headword associated with the image information to be further displayed.

That is, when the image identified by the image information is displayed, the headword associated with the image information is displayed. The displayed headword is a headword based on the received input. Further, the displayed headword is a headword whose detailed information has been searched for. The headword whose detailed information has been searched for is a headword based on the received input, and a word to be learned by a user. Therefore, there is achieved an effect that allows the user to efficiently learn a word to be learned.

The recording medium in accordance with the present invention records a control program. If search processing for searching for detailed information of a headword based on a received input is performed while an image is being displayed, the control program causes the headword corresponding to the detailed information searched for by the search processing and image information identifying the image being displayed to be stored in an associated manner. When the image identified by the image information is displayed, the control program causes the headword associated with the image information to be further displayed.

That is, when the image identified by the image information is displayed, the headword associated with the image information is displayed. The displayed headword is a headword based on the received input. Further, the displayed headword is a headword whose detailed information has been searched for. The headword whose detailed information has been searched for is a headword based on the received input, and a word to be learned by a user. Therefore, there is achieved an effect that allows the user to efficiently learn a word to be learned.

If search processing for searching for detailed information of a headword based on a received input is performed while an image is being displayed, the control method in accordance with the present invention causes the headword corresponding to the detailed information searched for by the search processing and image information identifying the image being displayed to be stored in an associated manner. When the image identified by the image information is displayed, the control method causes the headword associated with the image information to be further displayed.

That is, when the image identified by the image information is displayed, the headword associated with the image information is displayed. The displayed headword is a headword based on the received input. Further, the displayed headword is a headword whose detailed information has been searched for. The headword whose detailed information has been searched for is a headword based on the received input, and a word to be learned by a user. Therefore, there is achieved an effect that allows the user to efficiently learn a word to be learned.

BRIEF DESCRIPTION OF THE DRAWINGS

FIG. 7 is a view showing headword-related data as an example.

FIG. 8 is a view showing information acquisition source identification data as an example.

FIG. 9 is a view showing headword-related data as an example.

FIG. 10 is a view showing information acquisition source identification data as an example.

FIG. 11 is a view showing headword-related data as an example.

FIG. 13 is a view showing a list image as an example.

FIG. 19 is a view showing headword-related data as an example.

FIG. 22 is a view showing a list image as an example.

FIG. 24 is a view showing a list image as an example.

DESCRIPTION OF THE REFERENCE SIGNS

Figure 1:
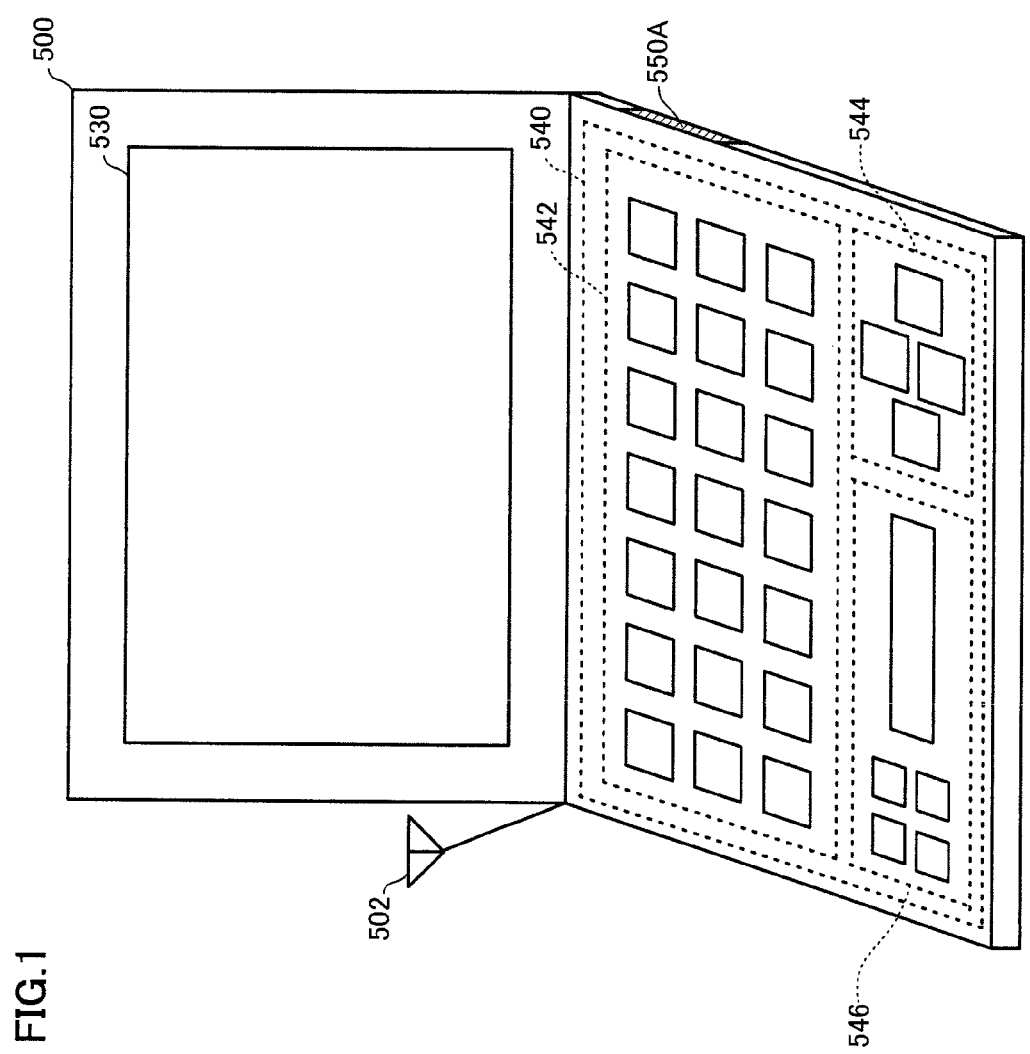
FIG. 1 is a view showing an external appearance of a translation apparatus in the present embodiment.

70: network, 180: program, 500: translation apparatus, 510: control unit, 520: storage unit, 530: display unit, 540: input unit, 555: recording medium.

BEST MODES FOR CARRYING OUT THE INVENTION

Hereinafter, embodiments of the present invention will be described with reference to the drawings. In the description below, identical parts will be designated by the same reference numerals. Since their names and functions are also the same, the detailed description thereof will not be repeated.

It is assumed that an electronic device in the present invention is a portable translation apparatus. The electronic device in the present invention is not limited to a translation apparatus, and may be, for example, any portable apparatus (for example, a PDA (Personal Digital Assistance), a PC (Personal Computer)).

The translation apparatus has a function of translating a language that is input (hereinafter also referred to as an input language) into a language other than the input language (hereinafter also referred to as a translated language). Here, it is assumed that the input language is Japanese, as an example. The input language is not limited to Japanese, and may be another language. It is also assumed that the translated language is, for example, English, Chinese, German, or the like.

Further, the translation apparatus has a function of displaying the meaning, the explanation, a translated word, and the like of a word that is input (hereinafter also referred to as an input word).

First Embodiment (External Appearance of Translation Apparatus)

FIG. 1 is a view showing an external appearance of a translation apparatus 500 in the present embodiment. Referring to FIG. 1, translation apparatus 500 includes a display unit 530 and an input unit 540.

Display unit 530 has a function of displaying characters, an image, and the like. Display unit 530 is an apparatus using an LCD panel (Liquid Crystal Display panel). Display unit 530 may be an apparatus using a panel that employs a display system other than that described above. Display unit 530 has a resolution of 640 dots (horizontal)×480 dots (vertical). The resolution of display unit 530 is not limited to 640 dots (horizontal)×480 dots (vertical), and display unit 530 may have another resolution.

Further, display unit 530 has a touch-panel function that allows a user to input information by directly touching a screen. Display unit 530 transmits information of a position at which the user touches the screen to a control unit 510 described later. Control unit 510 performs predetermined processing based on the received position information.

Input unit 540 includes a button group 542, a direction button group 544, and a button group 546. Button group 542 includes a plurality of buttons for inputting numbers, characters, and the like. Hereinafter, buttons for inputting numbers included in button group 542 will also be referred to as numeric buttons. Further, buttons for inputting characters included in button group 542 will also be referred to as character buttons. Direction button group 544 includes a plurality of direction buttons. Each of the plurality of direction buttons is a button that, when depressed in a case where an image is being displayed on display unit 530, moves an object to be moved (for example, a cursor or the like) in the image in a set direction (for example, up, down, left, or right).

Button group 546 includes a plurality of function buttons. Each of the plurality of function buttons is a button for performing assigned processing when depressed. Hereinafter, a depressing operation in which the user depresses any of the plurality of buttons included in input unit 540 for a short period of time (for example, less than one second) will also be referred to as a short depressing operation. In addition, a depressing operation in which the user depresses any of the plurality of buttons included in input unit 540 for a long period of time (for example, one second or more) will also be referred to as a long depressing operation.

Input unit 540 transmits, to control unit 510 described later, a button signal corresponding to a button subjected to a short depressing operation or a long depressing operation among the plurality of buttons included in input unit 540. That is, input unit 540 is an interface for allowing the user to operate translation apparatus 500. Hereinafter, an operation of input unit 540 or a touch operation on display unit 530 performed by the user will also be referred to as an interface operation M.

Translation apparatus 500 has a dictionary mode, a TV mode, and a multi-mode. The dictionary mode is a mode for displaying the meaning, the explanation, a translated word, and the like associated with a character string (for example, a word) input by interface operation M, on display unit 530. The TV mode is a mode for displaying an image based on a received broadcast signal (hereinafter also referred to as a TV image) on display unit 530. The multi-mode is a mode for further displaying the meaning, the explanation, a translated word, and the like associated with a character string (for example, a word) input by interface operation M, on display unit 530, with a TV image being displayed on display unit 530.

Translation apparatus 500 further includes a recording medium insertion portion 550A, and an antenna 502. Recording medium insertion portion 550A is a portion for inserting a recording medium described later into translation apparatus 500. Antenna 502 is provided for receiving a broadcast signal.

(Internal Configuration of Translation Apparatus)

Figure 2:
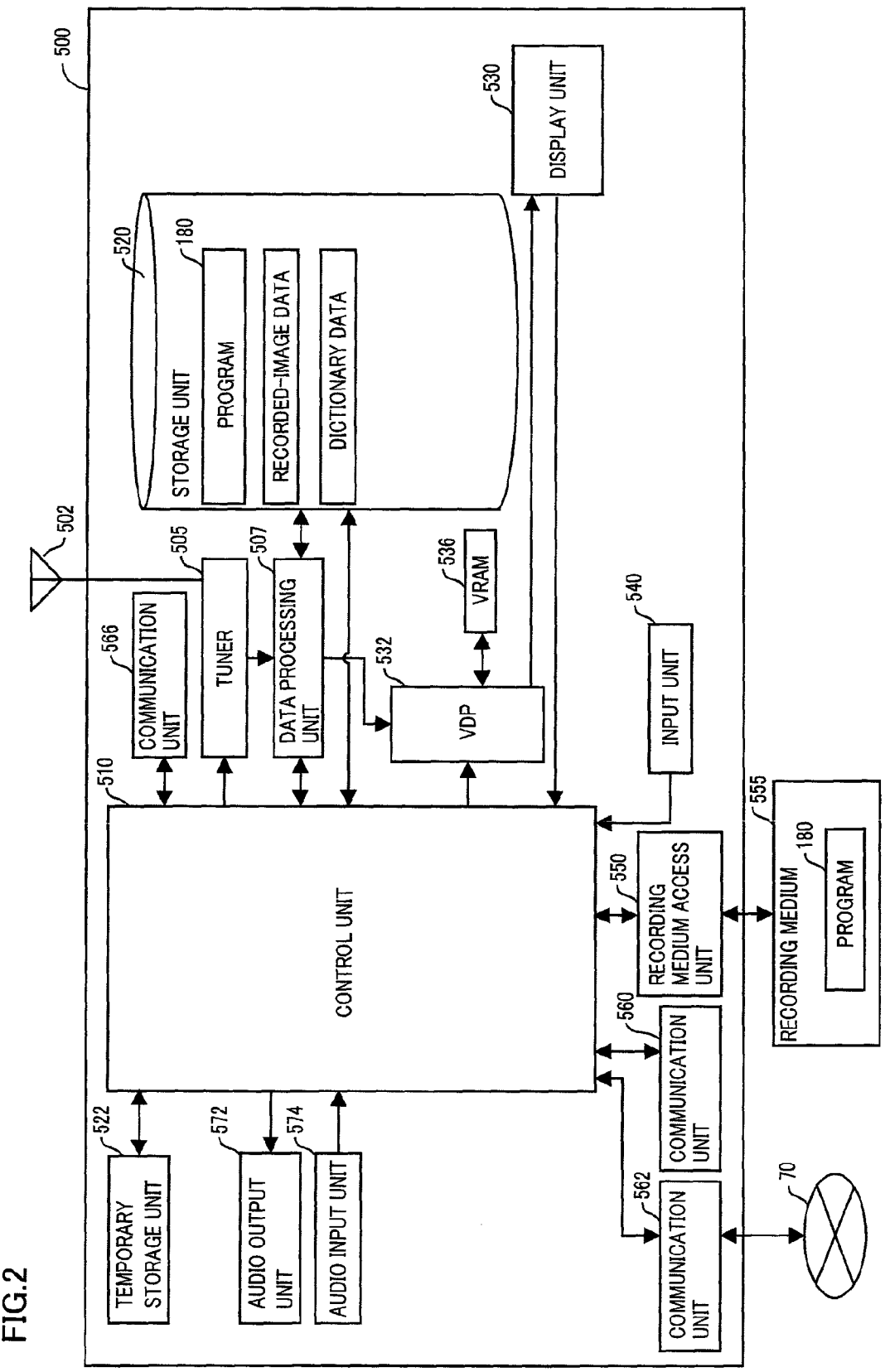
FIG. 2 is a block diagram showing an internal configuration of the translation apparatus.

FIG. 2 is a block diagram showing an internal configuration of translation apparatus 500. FIG. 2 also shows a recording medium 555 for the purpose of explanation. Recording medium 555 records a program 180 described later. That is, program 180 is recorded in a medium or the like and distributed as a program product. Recording medium 555 is also distributed as a program product.

Referring to FIG. 2, translation apparatus 500 further includes control unit 510, a temporary storage unit 522, and a storage unit 520.

Storage unit 520 has a function of storing data in a non-volatile manner. Storage unit 520 is data-accessed by control unit 510. Storage unit 520 is a medium capable of retaining data in a non-volatile manner without power supply (for example, a flash memory). Storage unit 520 stores program 180, recorded-image data described later, plural types of dictionary data, and other various data. The plural types of dictionary data include, for example, dictionary data for translating Japanese into English, dictionary data for translating English into Japanese, dictionary data for translating Japanese into German, dictionary data for indicating the explanation of a Japanese word in Japanese, and the like. Each of the plural types of dictionary data includes a plurality of headwords, and a plurality of detailed information respectively associated with the plurality of headwords. Here, the detailed information is information such as the meaning, the explanation, a translated word, and the like of a corresponding headword.

Control unit 510 has a function of performing various processing for the units in translation apparatus 500, computation processing, and the like, in accordance with program 180 stored in storage unit 520. Control unit 510 is a CPU (Central Processing Unit). Control unit 510 is not limited to a CPU, and may be another circuit having a computation function.

Temporary storage unit 522 is used as a work memory that is data-accessed by control unit 510 and temporarily stores data. Temporary storage unit 522 is a DRAM (Dynamic Random Access Memory). Temporary storage unit 522 is not limited to a DRAM, and may be another circuit capable of storing data in a volatile manner.

Translation apparatus 500 further includes antenna 502, a tuner 505, and a data processing unit 507.

Antenna 502 described above is connected to tuner 505. Tuner 505 receives a broadcast signal with a frequency instructed by control unit 510, via antenna 502. Tuner 505 has a function of receiving broadcast signals based on digital broadcasting and analog broadcasting. Hereinafter, an image based on a broadcast signal received by tuner 505 will also be referred to as a TV image.

The broadcast signal includes image data, audio data, text data, and EPG (Electric Program Guide: registered trademark) data. If the broadcast signal is a signal based on digital broadcasting, the broadcast signal further includes BML (Broadcast Markup Language) data and the like. EPG (registered trademark) data is data indicating a plurality of broadcast program information. BML data is data for controlling a layout position, an operation, and the like of each of image data, audio data, and text data. Tuner 505 transmits the received broadcast signal to data processing unit 507.

Data processing unit 507 demodulates the received broadcast signal to generate demodulated data. If the received broadcast signal is a signal based on analog broadcasting, data processing unit 507 performs a process described below. Firstly, data processing unit 507 decodes the demodulated data, acquires image data and audio data, and acquires text data and EPG (registered trademark) data from a VBI (Vertical Blanking Interval) of the broadcast signal.

When data processing unit 507 receives from control unit 510 a display instruction for causing display unit 530 to display an image, data processing unit 507 transmits the image data to a VDP (Video Display Processor) 532 described later. When VDP 532 receives the image data, VDP 532 causes display unit 530 to display an image based on the image data (i.e., a moving image or a still image).

Further, when data processing unit 507 receives from control unit 510 an image-recording instruction for performing an image-recording process, data processing unit 507 compresses the image data and the audio data, and causes storage unit 520 to store them as recorded-image data. Hereinafter, the recorded-image data in this case will also referred to as a content. The recorded-image data is data compressed in the H.264 format. The recorded-image data is not limited to data compressed in the H.264 format, and may be data compressed in another format. Here, another format is, for example, a format such as MPEG (Moving Picture Experts Group) 1, MPEG2, or the like.

Further, if the received broadcast signal is a signal based on digital broadcasting, data processing unit 507 performs a process described below. Firstly, data processing unit 507 decodes the demodulated data based on a protocol for digital broadcasting to generate decode data. The decode data includes image data, audio data, text data, EPG (registered trademark) data, and BML data. The image data and the audio data included in the decode data are data compressed in the H.264 format. The image data and the audio data included in the decode data are not limited to data compressed in the H.264 format, and may be data compressed in another format. Here, another format is, for example, a format such as MPEG1, MPEG2, or the like.

When data processing unit 507 receives from control unit 510 a display instruction for causing display unit 530 to display an image, data processing unit 507 transmits the image data included in the decode data of a channel designated by the display instruction, to VDP 532 described later. When VDP 532 receives the image data, VDP 532 causes display unit 530 to display an image based on the image data (i.e., a moving image or a still image).

Further, when data processing unit 507 receives from control unit 510 an image-recording instruction for performing an image-recording process, data processing unit 507 causes storage unit 520 to store the decode data of a channel designated by the image-recording instruction as recorded-image data. Hereinafter, the recorded-image data in this case will also referred to as a content. In this case, the recorded-image data includes image data, audio data, text data, and BML data.

Further, when data processing unit 507 receives from control unit 510 a request instruction for requesting text data, EPG (registered trademark) data, or the like, data processing unit 507 transmits the requested text data or EPG (registered trademark) data to control unit 510.

Translation apparatus 500 further includes VDP 532 and a VRAM (Video Random Access Memory) 536.

VRAM 536 has a function of temporarily storing image data.

Control unit 510 provides an image-drawing instruction to VDP 532 in accordance with program 180 stored in storage unit 520. The image-drawing instruction is an instruction for generating an image and causing display unit 530 to display the image.

VDP 532 is connected to display unit 530. VDP 532 reads font data, graphic data, and the like from program 180 described later in storage unit 520, in accordance with the image-drawing instruction from control unit 510, and generates an image utilizing VRAM 536. Then, VDP 532 reads image data stored in VRAM 536, and causes display unit 530 to display an image based on the image data.

Translation apparatus 500 further includes input unit 540 and a recording medium access unit 550.

Control unit 510 receives from input unit 540 a button signal corresponding to a button subjected to a short depressing operation or a long depressing operation among the plurality of buttons described above included in input unit 540. Control unit 510 performs processing corresponding to the received button signal.

When recording medium 555 is inserted (mounted) into translation apparatus 500 via recording medium insertion portion 550A described above, recording medium access unit 550 can perform data access to recording medium 555. Thereby, recording medium access unit 550 can read program 180 from recording medium 555 that records program 180.

Program 180 stored in recording medium 555 is read by recording medium access unit 550 through an install process performed by control unit 510, and control unit 510 causes storage unit 520 to store program 180. A program for the install process is contained in storage unit 520 beforehand, and the install process is performed by control unit 510 based on the program for the install process.

It is to be noted that program 180 may not be installed in storage unit 520. In this case, control unit 510 reads program 180 stored in recording medium 555 via recording medium access unit 550, and performs predetermined processing based on program 180. Recording medium 555 further records content data and the like. The content data is, for example, dictionary data, music data, moving image data, and the like.

Recording medium 555 is an SD (Secure Digital) memory card. Recording medium 555 is not limited to an SD memory card, and may be another medium capable of recording data in a non-volatile manner.

Translation apparatus 500 further includes a communication unit 560 and a communication unit 562.

Communication unit 560 transmits and receives data to and from control unit 510. Further, communication unit 560 has a function of performing wired or wireless data transmission and reception with another apparatus.

Communication unit 560 has a function of a communication interface based on the USB (Universal Serial Bus: registered trademark) 2.0 standard. The standard for a communication interface is not limited to USB (registered trademark) 2.0, and may be another standard.

In addition, communication unit 560 further has a wireless data communication function. The wireless data communication function has a function of performing wireless data communication using Bluetooth (registered trademark). The wireless data communication is not limited to a system using Bluetooth (registered trademark), and may be another communication system using, for example, infrared rays or the like. Communication unit 560 performs wireless data communication with another apparatus in accordance with a control instruction from control unit 510.

Communication unit 562 transmits and receives data to and from control unit 510. Communication unit 562 has a function of performing data communication utilizing a wireless technique based on IEEE802.11g, which is a standard for wireless LAN. The wireless technique is not limited to a technique based on IEEE802.11g, and may be another wireless technique. Therefore, communication unit 562 can perform data communication with a network 70 wirelessly. Network 70 is an external network such as the Internet.

In addition, communication unit 562 further has a function of a communication interface utilizing Ethernet (registered trademark). Therefore, communication unit 562 can perform data communication with network 70 via a LAN cable.

Computer 500 can also perform a process for downloading a program from network 70 and store the program in storage unit 520, through processing performed by control unit 510 and communication unit 562. In this case, the downloaded program is program 180.

Control unit 510 performs predetermined processing in accordance with the program downloaded from network 70 (i.e., program 180). A program for the downloading is contained in storage unit 520 beforehand, and the download process is performed by control unit 510 based on the program for the downloading.

Translation apparatus 500 further includes a communication unit 566. Communication unit 566 has a GPS (Global Positioning System) function. The GPS function is a function for communicating with an artificial satellite to acquire information of a position of translation apparatus 500 (i.e., a position based on a latitude, a longitude, an altitude, and the like thereof) (hereinafter also referred to as GPS position information). Communication unit 566 acquires GPS position information in accordance with a control instruction from control unit 510, and transmits it to control unit 510.

Translation apparatus 500 further includes an audio output unit 572 and an audio input unit 574.

Audio output unit 572 has a function of outputting audio corresponding to processing performed in control unit 510. Audio output unit 572 includes a speaker for outputting audio. Audio output unit 572 outputs audio based on audio data received from control unit 510, from the speaker.

Audio input unit 574 has a function of inputting audio. Audio input unit 574 includes a microphone for inputting audio. Audio input unit 574 converts audio acquired by the microphone into audio data, and transmits the audio data to control unit 510. For example, when the user provides audio to the microphone included in audio input unit 574, audio input unit 574 converts the audio acquired by the microphone into audio data, and transmits the audio data to control unit 510.

(Image-Recording Process)

Next, an image-recording process performed in translation apparatus 500 will be described. The image-recording process is a process for recording a TV image based on a broadcast signal received by tuner 505. The image-recording process is a process for recording an image of a broadcast program for which image-recording has been reserved by interface operation M, or a process performed when interface operation M for recording a TV image being displayed on display unit 530 is made.

The image-recording process is not limited to a process for recording an image of a broadcast program and the like, and may be, for example, a process for causing storage unit 520 to store a video content streaming-distributed from the Internet. Hereinafter, a video content to be recorded by the image-recording process will also be referred to as an image-recording target content.

It is herein assumed that image recording of a broadcast program titled "English Conversation Course AA" has been reserved beforehand by interface operation M in translation apparatus 500. Hereinafter, a broadcast program for which image recording has been reserved will also be referred to as an image-recording reserved broadcast program. In this case, the image-recording reserved broadcast program is the broadcast program titled "English Conversation Course AA". The title of a broadcast program is acquired from EPG (registered trademark) data and the like.

Next, an image-recording process performed in translation apparatus 500 when the current time reaches image-recording reservation time of an image-recording reserved broadcast program will be described. In this case, the image-recording reserved broadcast program is the image-recording target content. The image-recording process may be performed when interface operation M for recording a TV image being displayed on display unit 530 is made. It is herein assumed that translation apparatus 500 is in the multi-mode.

Figure 3:
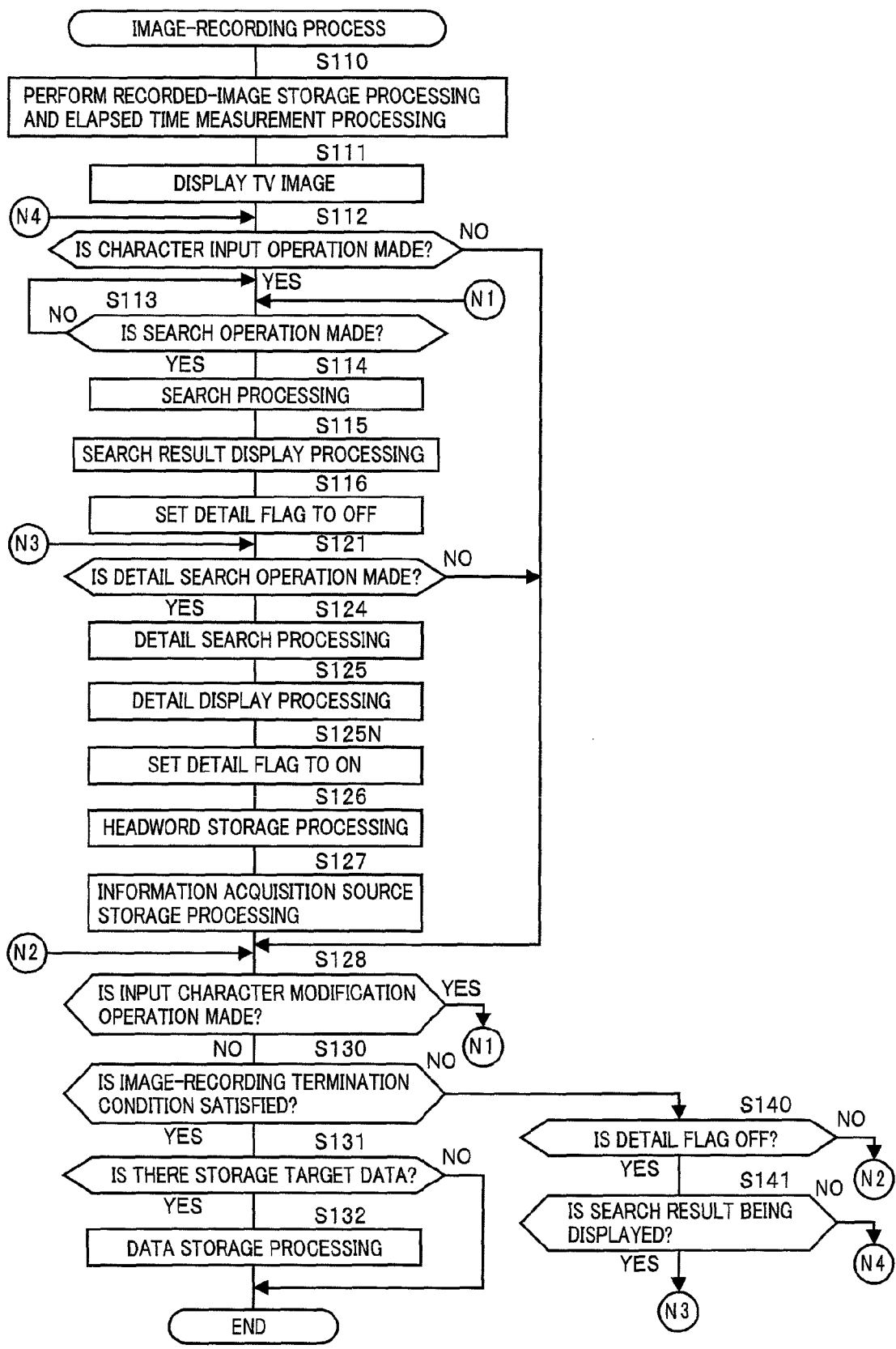
FIG. 3 is a flowchart of an image-recording process.

FIG. 3 is a flowchart of the image-recording process. Referring to FIG. 3, in the image-recording process, processing in step S110 is initially performed.

In step S110, control unit 510 performs recorded-image storage processing and elapsed time measurement processing Each of the recorded-image storage processing and the elapsed time measurement processing is performed independent of other processing. Then, processing in step S111 is performed.

In the recorded-image storage processing, control unit 510 performs processing for causing storage unit 520 to store the image-recording target content. The elapsed time measurement processing is processing for measuring elapsed time of the recorded-image storage processing.

In step S111, a TV image is displayed. Specifically, control unit 510 causes display unit 530 to display an image of the image-recording target content (hereinafter also referred to as a TV image), utilizing VDP 532. In this case, a search image MG100 described below is displayed on display unit 530. That is, control unit 510 causes storage unit 520 to store the image-recording target content by the recorded-image storage processing, and also causes display unit 530 to display the TV image of the image-recording target content. Then, the processing in step S111 is terminated.

Figure 4:
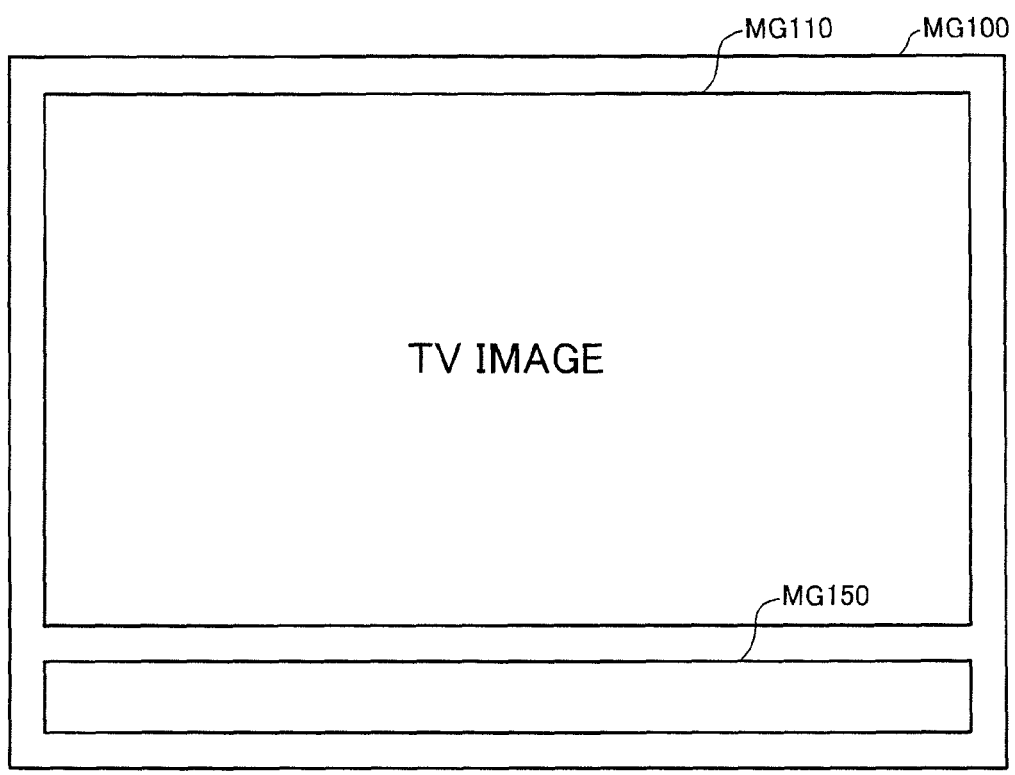
FIG. 4 is a view showing a search image as an example.

FIG. 4 is a view showing search image MG100 as an example. Referring to FIG. 4, a TV image MG110 is displayed in search image MG100. TV image MG110 is a TV image displayed by the processing in step S111. It is to be noted that TV image MG110 is a moving image. Here, TV image MG110 is a moving image of the broadcast program titled "English Conversation Course AA".

Further, a search character input box MG150 is arranged in search image MG100. Search character input box MG150 is a box for inputting characters by interface operation M. Hereinafter, characters input in search character input box MG150 by interface operation M will also be referred to as search target characters.

Referring to FIG. 3 again, after the processing in step S111, control unit 510 advances the process to step S112.

In step S112, control unit 510 determines whether or not a character input operation is made. The character input operation is interface operation M for inputting characters in search character input box MG150. If YES in step S112, control unit 510 advances the process to step S113. If NO in step S112, control unit 510 advances the process to step S128 described later. Here, on the assumption that a character input operation is made, control unit 510 advances the process to step S113.

It is herein assumed that the search target characters input in search character input box MG150 by the character input operation represent, as an example, an English word "sleep". It is assumed that the search target characters input in search character input box MG150 by the character input operation represent, as an example, a word whose meaning is unknown to the user that the user encounters while viewing the TV image displayed on display unit 530. That is, the search target characters represent a word to be learned by the user.

In step S113, control unit 510 determines whether or not a search operation is made. The search operation is interface operation M for searching for information for acquiring the detailed information of the search target characters (hereinafter also referred to as detail acquiring information). If YES in step S113, control unit 510 advances the process to step S114. If NO in step S113, the processing in step S113 is performed again. Here, on the assumption that a search operation is made, control unit 510 advances the process to step S114.

In step S114, search processing is performed. In the search processing, local search processing is performed. In the local search processing, control unit 510 searches the plural types of dictionary data stored in storage unit 520, for dictionary data including the search target characters as a headword and dictionary data including a headword including the search target characters. It is herein assumed that a plurality of dictionary data including the search target characters as a headword and a plurality of dictionary data including a headword including the search target characters are searched for. In this case, names of the dictionary data searched for are the detail acquiring information.

Further, in the search processing, network search processing is performed. In the network search processing, control unit 510 searches network 70 for the detail acquiring information for acquiring the detailed information of the search target characters. Hereinafter, the detail acquiring information searched for in network 70 will also be referred to as net detail acquiring information. It is herein assumed that the net detail acquiring information is an URL (Uniform Resource Locator) for acquiring the detailed information of the search target characters. The net detail acquiring information is not limited to an URL. The net detail acquiring information may be, for example, information including an URL and a character string including search target characters.

It is herein assumed that a search server is connected to network 70. The search server is a server that, upon receiving search target characters as search information, searches for net detail acquiring information for acquiring the detailed information of the received search target characters.

Specifically, in the network search processing, control unit 510 performs processing for transmitting the search target characters to the search server via network 70, utilizing communication unit 562. When the search server stores the net detail acquiring information for acquiring the detailed information of the received search target characters, the search server transmits the net detail acquiring information to translation apparatus 500.

By this processing, control unit 510 receives, from the search server, the net detail acquiring information for acquiring the search target characters. It is herein assumed that control unit 510 receives, from the search server, a plurality of net detail acquiring information for acquiring the search target characters. Then, control unit 510 advances the process to step S115.

In step S115, search result display processing is performed. In the search result display processing, control unit 510 generates a search result display image utilizing VDP 532, and causes display unit 530 to display the generated search result display image together with the TV image. The search result display image is an image displaying the result of the local search processing and the result of the network search processing.

It is herein assumed that a plurality of dictionary data including the search target characters as a headword and a plurality of dictionary data including a headword including the search target characters are searched for by the local search processing, and that a plurality of net detail acquiring information are received by the network search processing. In this case, display unit 530 displays a search image MG100A described below in which a search result display image MG160 described below is displayed in addition to the TV image. Search result display image MG160 is an image displaying the names of the dictionary data searched for by the local search processing and the net detail acquiring information received by the network search processing. Then, the processing in step S115 is terminated.

Figure 5:
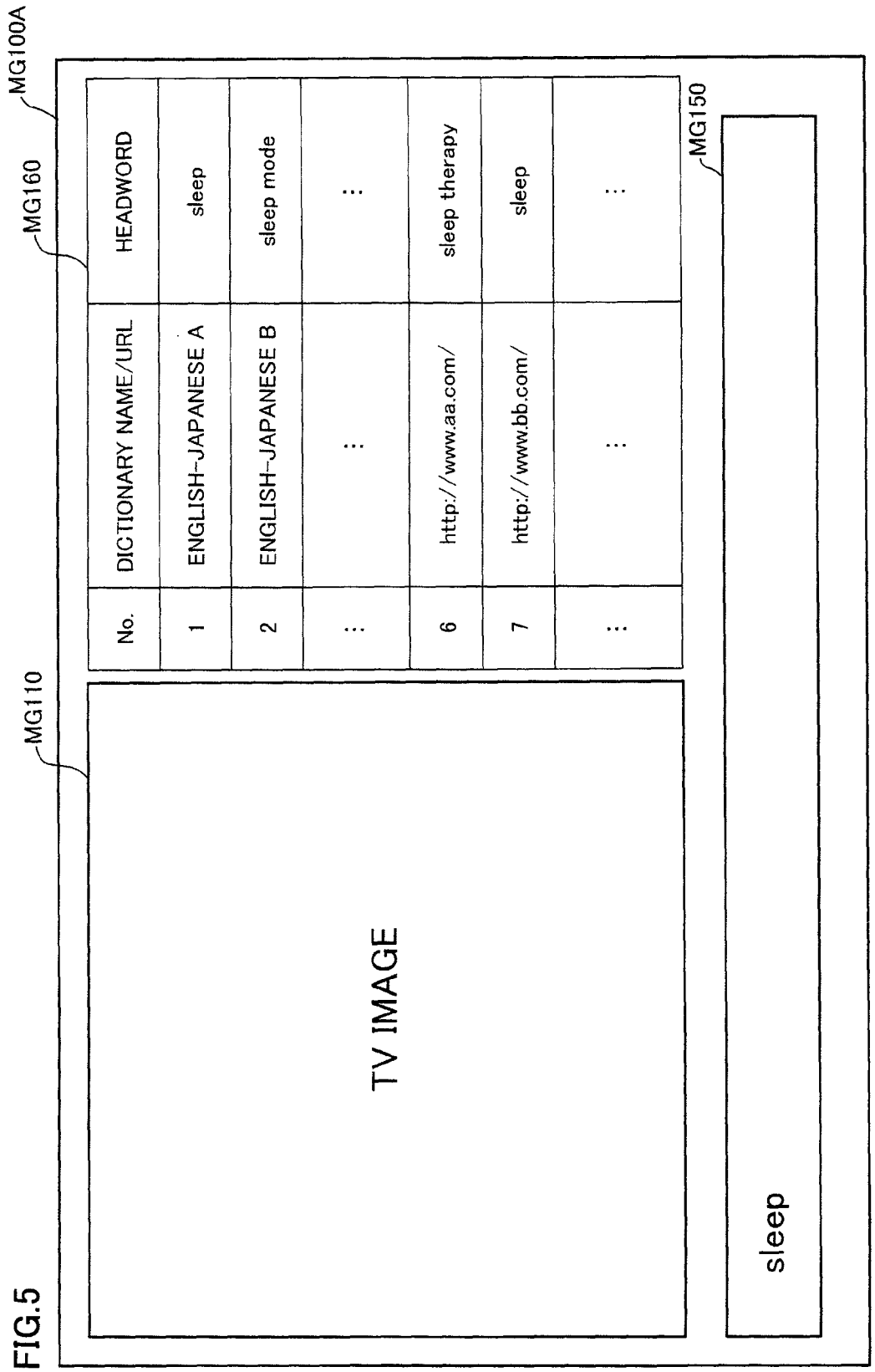
FIG. 5 is a view showing a search image as an example.

FIG. 5 is a view showing search image MG100A as an example. Referring to FIG. 5, when compared with search image MG100 in FIG. 4, search image MG100A is different in that a display region for TV image MG110 is smaller, that search result display image MG160 is further arranged, and that the search target characters "sleep" are input in search character input box MG150. Since search image MG100A is otherwise the same as search image MG100, detailed description will not be repeated.

Search result display image MG160 displays a plurality of headword data. In search result display image MG160, the "No." represents a number for identifying any of the plurality of headword data. In the column for an item "DICTIONARY NAME/URL", the name of the dictionary data searched for by the local search processing or the net detail acquiring information (URL) received by the network search processing is displayed. In search result display image MG160, a "HEADWORD" refers to search target characters, a headword including search target characters, a character string including search target characters, and the like used to search for corresponding dictionary data or corresponding net detail acquiring information (URL).

For example, the headword data numbered "1" represents the name "English-Japanese A" of the dictionary data including the headword "sleep". The headword data numbered "7" represents the net detail acquiring information (URL) for acquiring the detailed information of the headword "sleep". Each of the plurality of headword data displayed in search result display image MG160 can be selected by an operation of depressing a numeric button included in button group 542.

Referring to FIG. 3 again, after the processing in step S115, control unit 510 advances the process to step S116.

In step S116, control unit 510 sets a detail flag to OFF. The detail flag is a flag indicating whether or not the detailed information is being displayed by processing described later. If the detail flag is ON, it indicates that the detailed information is being displayed. If the detail flag is OFF, it indicates that the detailed information is not being displayed. The detail flag is stored in storage unit 520 beforehand. In an initial state, the detail flag is set to OFF. Then, control unit 510 advances the process to step S121.

In step S121, control unit 510 determines whether or not a detail search operation is made. The detail search operation is interface operation M for searching for the detailed information of the headword. As an example, the detail search operation is an operation of depressing a numeric button included in button group 542 for inputting a number displayed in search result display image MG160. That is, the detail search operation is an operation for selecting any of the plurality of headword data displayed in search result display image MG160. If YES in step S121, control unit 510 advances the process to step S124. If NO in step S121, control unit 510 advances the process to step S128 described later. Here, on the assumption that a detail search operation is made, control unit 510 advances the process to step S124. It is herein assumed that the detail search operation is an operation of depressing a numeric button for inputting the number "1".

In step S124, detail search processing is performed. In the detail search processing, control unit 510 searches for the detailed information of the headword indicated in the headword data selected by the detail search operation. It is herein assumed that the headword data selected by the detail search operation is, as an example, the headword data numbered "1".

In this case, control unit 510 searches the dictionary data named "English-Japanese A" indicated in the headword data numbered "1", for the detailed information of the headword "sleep". If the headword data selected by the detail search operation is, for example, the headword data numbered "7", control unit 510 accesses a website with the TJRL "http://www.bb.com/" utilizing communication unit 562, and searches for and acquires the detailed information of the headword "sleep". Then, control unit 510 advances the process to step S125.

In step S125, detail display processing is performed. In the detail display processing, control unit 510 generates a detail display image utilizing VDP 532, and causes display unit 530 to display the generated detail display image together with the TV image. The detail display image is an image displaying the detailed information of the headword indicated in the selected headword data. It is herein assumed that the selected headword data is, as an example, the headword data numbered "1" displayed in search result display image MG160. In this case, display unit 530 displays a search image MG100B described below in which a detail display image MG160A described below is displayed in addition to the TV image.

Figure 6:
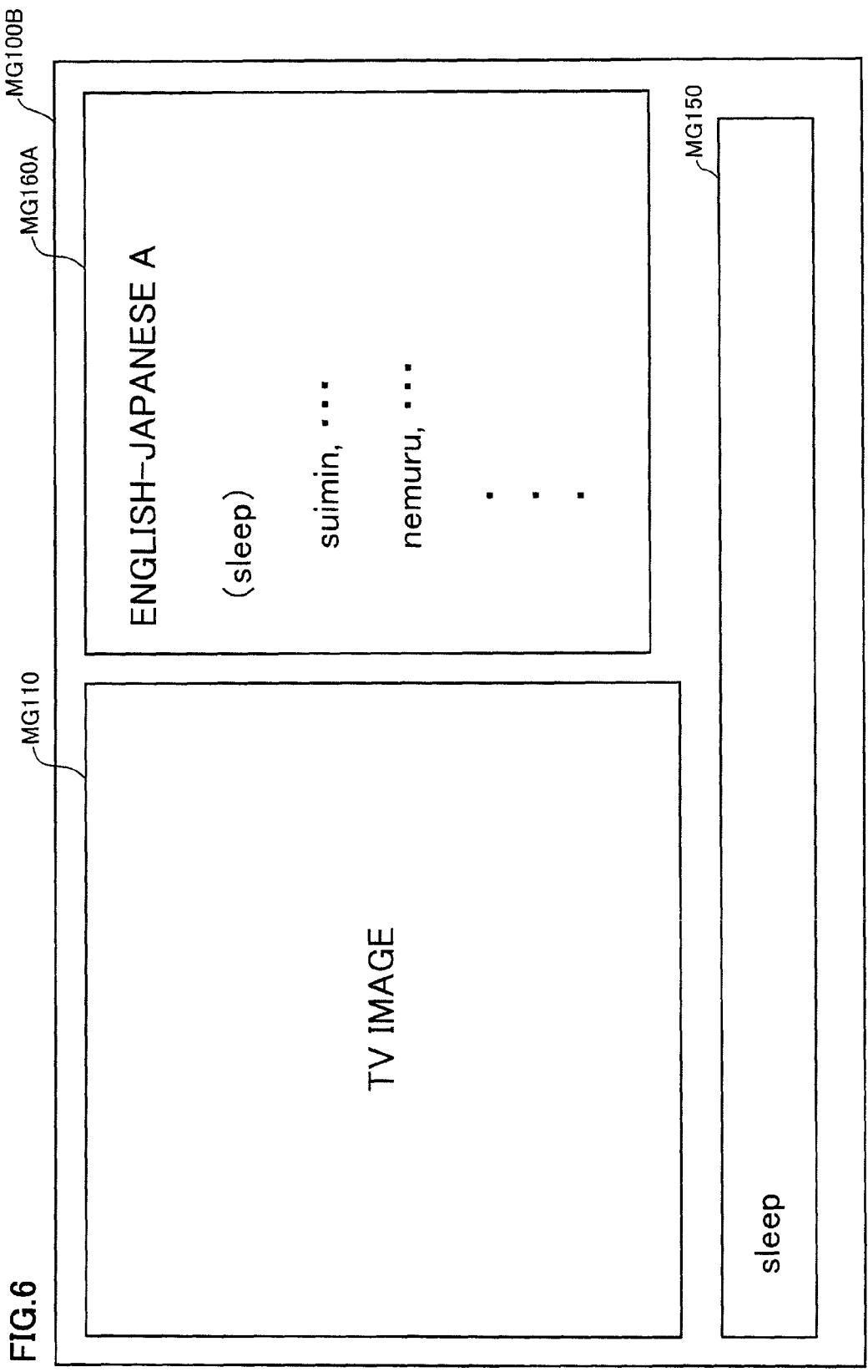
FIG. 6 is a view showing a search image as an example.

FIG. 6 is a view showing search image MG100B as an example. Referring to FIG. 6, when compared with search image MG100A in FIG. 5, search image MG100B is different in that detail display image MG160A is arranged instead of search result display image MG160. Since search image MG100B is otherwise the same as search image MG100A, detailed description will not be repeated.

Detail display image MG160A displays the name "English-Japanese A" of the dictionary data indicated in the selected headword data numbered "1", the headword "sleep" indicated in the headword data numbered "1", and the detailed information of the headword "sleep". As described above, the detailed information is information such as the meaning, the explanation, a translated word, and the like of a corresponding headword.

If the selected headword data is, for example, the headword data numbered "7", detail display image MG160A displays the net detail acquiring information (URL "http://www.b-b.com/") indicated in the headword data numbered "7", the headword "sleep" indicated in the headword data numbered "7", and the detailed information of the headword "sleep" acquired from the website with the URL "http://www.b-b.com/".

Hereinafter, a TV image that is being displayed on display unit 530 when the detailed information is searched for and displayed on display unit 530 will also be referred to as a TV image at the time of searching for the detailed information. Therefore, TV image MG110 is a TV image at the time of searching for the detailed information.

Referring to FIG. 3 again, in the detail display processing in step S125, control unit 510 causes temporary storage unit 522 to store the current time being measured by the elapsed time measurement processing (hereinafter also referred to as searched information display time). The searched information display time is time at which the detailed information searched for is displayed while the TV image as a moving image is being displayed. If the searched information display time is already stored in temporary storage unit 522, the latest searched information display time is stored in an overwriting manner.

It is assumed that the searched information display time is, as an example, "8 minutes 22 seconds". In this case, the searched information display time indicates that "8 minutes 22 seconds" have elapsed since the start of the recorded-image storage processing. That is, the searched information display time "8 minutes 22 seconds" indicates that the detailed information searched for is displayed at a point where "8 minutes 22 seconds" have elapsed from the beginning of the image-recording target content. Then, control unit 510 advances the process to step S125N.

In step S125N, control unit 510 sets the detail flag to ON. The detail flag is a flag indicating whether or not the detailed information is being displayed. If the detail flag is ON, it indicates that the detailed information is being displayed. If the detail flag is OFF, it indicates that the detailed information is not being displayed. The detail flag is stored in storage unit 520 beforehand. Then, control unit 510 advances the process to step S126.

In step S126, headword storage processing is performed. In the headword storage processing, control unit 510 causes temporary storage unit 522 to store headword-related data in which the title of the TV image at the time of searching for the detailed information, the headword corresponding to the detailed information searched for (hereinafter also referred to as searched detailed information), information for identifying a source for acquiring the searched detailed information, and the searched information display time stored in temporary storage unit 522 are associated.

It is herein assumed that the title of the TV image at the time of searching for the detailed information is "English Conversation Course AA", that the headword corresponding to the searched detailed information is "sleep", and that the source for acquiring the detailed information is the dictionary data named "English-Japanese A". In this case, the information for identifying the source for acquiring the detailed information is the name "English-Japanese A" of the dictionary data. It is further assumed that the searched information display time stored in temporary storage unit 522 is "8 minutes 22 seconds". In this case, temporary storage unit 522 stores headword-related data D100 described below.

If temporary storage unit 522 stores headword-related data indicating the title of the TV image at the time of searching for the detailed information, control unit 510 adds, to the headword-related data, data in which the headword corresponding to the searched detailed information, information for identifying a source for acquiring the searched detailed information, and the searched information display time stored in temporary storage unit 522 are associated. Then, the processing in step S126 is terminated.

FIG. 7 is a view showing headword-related data D100 as an example. Referring to FIG. 7, the "TITLE" is the title of the TV image at the time of searching for the detailed information. The "HEADWORD" is the headword corresponding to the searched detailed information. The "INFORMATION ACQUISITION SOURCE" is the information for identifying the source for acquiring the detailed information. If the detailed information is acquired from a network such as the Internet, the information for identifying the source for acquiring the detailed information is the URL of a website (web page) displaying the acquired detailed information. Since the "SEARCHED INFORMATION DISPLAY TIME" is described above, detailed description will not be repeated.

Referring to FIG. 3 again, after the processing in step S126, control unit 510 advances the process to step S127.

In step S127, information acquisition source storage processing is performed. The information acquisition source storage processing is processing for storing the information for identifying the source for acquiring the detailed information displayed by the detail display processing in step S125.

In the information acquisition source storage processing, control unit 510 causes temporary storage unit 522 to store information acquisition source identification data in which the title of the TV image at the time of searching for the detailed information and the information for identifying the source for acquiring the detailed information are associated. It is herein assumed that the title of the TV image at the time of searching for the detailed information is "English Conversation Course AA", and that the source for acquiring the detailed information is the dictionary data named "English-Japanese A". In this case, the information for identifying the source for acquiring the detailed information is the name "English-Japanese A" of the dictionary data. In this case, temporary storage unit 522 stores information acquisition source identification data D110 described below.

If temporary storage unit 522 stores information acquisition source identification data indicating the title of the TV image at the time of searching for the detailed information, and the information acquisition source identification data does not display the information for identifying the source for acquiring the detailed information, control unit 510 adds the information for identifying the source for acquiring the detailed information, to the information acquisition source identification data. Then, the processing in step S127 is terminated.

FIG. 8 is a view showing information acquisition source identification data D110 as an example. Referring to FIG. 8, when compared with headword-related data D100 in FIG. 7, information acquisition source identification data D110 is different in that there are no items "HEADWORD" and "SEARCHED INFORMATION DISPLAY TIME". Since information acquisition source identification data D110 is otherwise the same as headword-related data D100, detailed description will not be repeated.

Referring to FIG. 3 again, after the processing in step S127, control unit 510 advances the process to step S128.

In step S128, control unit 510 determines whether or not an input character modification operation is made. The input character modification operation is interface operation M for modifying the characters input in search character input box MG150. It is to be noted that, if the processing in step S128 is performed after determination as NO is made in step S112, the input character modification operation is interface operation M for inputting characters in search character input box MG150 in which no characters have been input.

If YES in step S128, the processing in step S113 is performed again. If NO in step S128, control unit 510 advances the process to step S130 described later. Here, on the assumption that an input character modification operation is made, control unit 510 advances the process to step S113. It is herein assumed that search target characters input in search character input box MG150 by the input character modification operation represent, as an example, an English word "meet". It is assumed that the search target characters input in search character input box MG150 by the character input operation represent, as an example, a word whose meaning is unknown to the user that the user encounters while viewing the TV image displayed on display unit 530. That is, the search target characters represent a word to be learned by the user.

It is then assumed that the processing in steps S113 to S115 and steps S121 to S127 is performed as described above.

Subsequently, it is assumed that determination as NO is made in step S128. In this case, control unit 510 advances the process to step S130.

In step S130, control unit 510 determines whether or not an image-recording termination condition is satisfied. Here, the image-recording termination condition is a condition that the current time reaches time scheduled to terminate image-recording reservation. The image-recording termination condition is not limited to the condition described above, and may be, for example, a condition that interface operation M for terminating image recording is made. If YES in step S130, control unit 510 advances the process to step S131. If NO in step S130, control unit 510 advances the process to step S140. Here, on the assumption that the image-recording termination condition is not satisfied, control unit 510 advances the process to step S140.

In step S140, control unit 510 determines whether or not the detail flag is OFF. If YES in step S140, control unit 510 advances the process to step S141. If NO in step S140, the processing in step S128 is performed again.

In step S141, control unit 510 determines whether or not a search result is being displayed on display unit 530 by the search result display processing in step S115. If YES in step S141, the processing in step S121 is performed again. If NO in step S141, the processing in step S112 is performed again.

It is herein assumed that the processing in steps S114, S115, and S124 to S127 is performed a predetermined number of times (for example, twice) until determination as YES is made in step S130.

In this case, it is assumed that the headword-related data stored in temporary storage unit 522 is headword-related data D100A described below, and that the information acquisition source identification data stored in temporary storage unit 522 is information acquisition source identification data D110A described below.

FIG. 9 is a view showing headword-related data D100A as an example.

FIG. 10 is a view showing information acquisition source identification data D110A as an example.

Referring to FIG. 3 again, If determination as YES is made in step S130, control unit 510 terminates the recorded-image storage processing and the elapsed time measurement processing described above, and control unit 510 advances the process to step S131.

In step S131, it is determined whether or not there is storage target data. Specifically, control unit 510 determines whether or not temporary storage unit 522 stores the headword-related data and the information acquisition source identification data. If YES in step S131, control unit 510 advances the process to step S132. If NO in step S131, the image-recording process ends. Here, on the assumption that temporary storage unit 522 stores the headword-related data and the information acquisition source identification data, control unit 510 advances the process to step S132.

In step S132, data storage processing is performed. In the data storage processing, headword-related data in which the headword-related data and reproduction time of the image-recording target content stored in storage unit 520 by the recorded-image storage processing are associated is stored in storage unit 520. Then, control unit 510 erases the headword-related data stored in temporary storage unit 522.

It is herein assumed that temporary storage unit 522 stores headword-related data D100A, and that the reproduction time of the image-recording target content is, as an example, 30 minutes. In this case, control unit 510 causes storage unit 520 to store headword-related data D100B described below in which headword-related data D100A and the reproduction time of the image-recording target content stored in storage unit 520 by the recorded-image storage processing are associated.

FIG. 11 is a view showing headword-related data D100B as an example.

Referring to FIG. 3 again, in the data storage processing in step S132, control unit 510 causes storage unit 520 to store the information acquisition source identification data stored in temporary storage unit 522. Then, control unit 510 erases the information acquisition source identification data stored in temporary storage unit 522.

It is herein assumed that temporary storage unit 522 stores information acquisition source identification data D110A. In this case, information acquisition source identification data D110A is stored in storage unit 520. Then, the image-recording process ends.

(Reproduction Process)

Next, a process for reproducing an image-recording target content (hereinafter also referred to as an image-recorded content) stored in storage unit 520 by the image-recording process (hereinafter also referred to as a reproduction process) will be described. It is herein assumed that storage unit 520 stores a plurality of image-recorded contents after the image-recording process of FIG. 3 is performed a plurality of times, that storage unit 520 stores a plurality of headword-related data respectively corresponding to the plurality of image-recorded contents, and that storage unit 520 stores a plurality of information acquisition source identification data respectively corresponding to the plurality of image-recorded contents.

Figure 12:
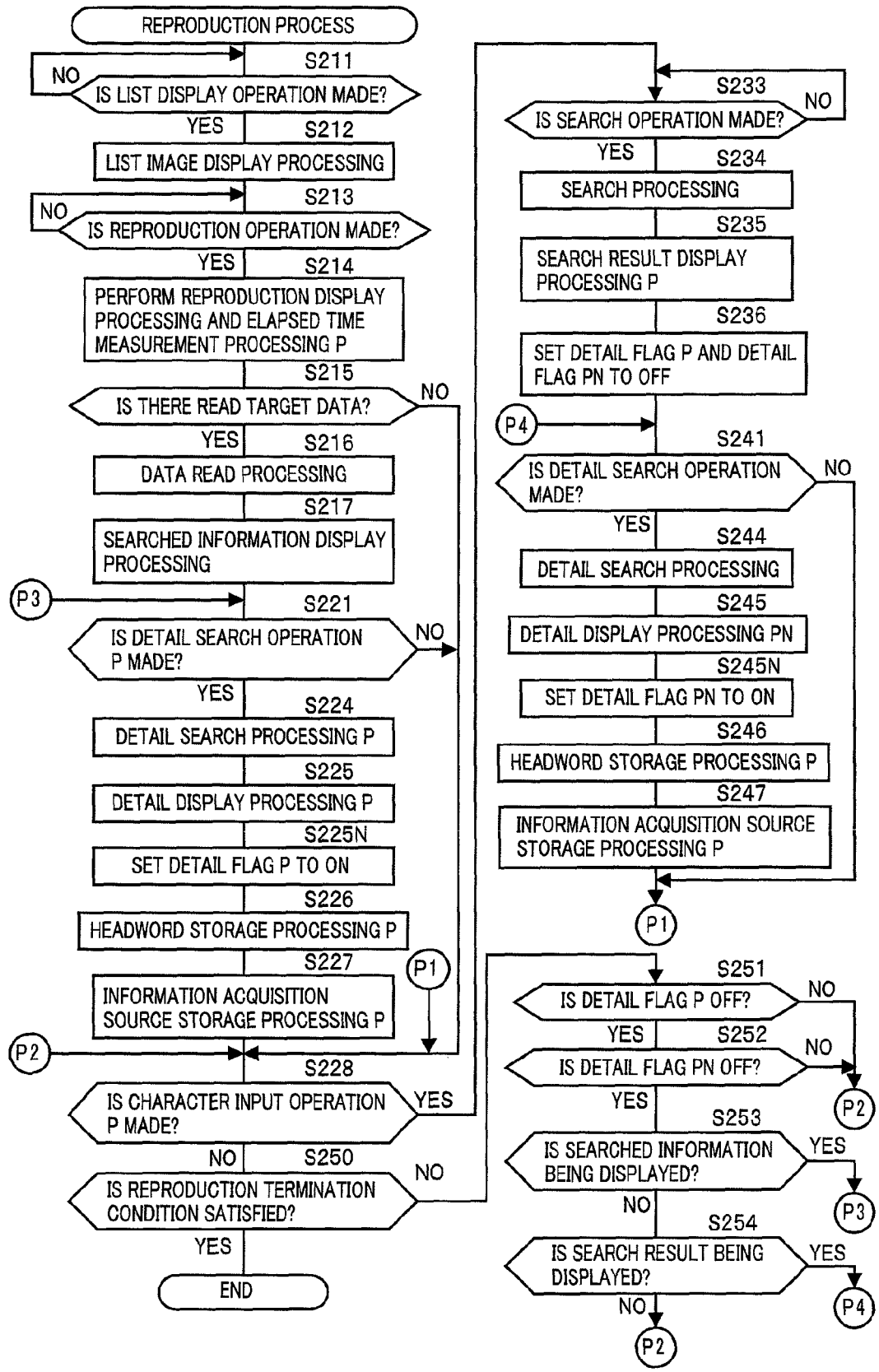
FIG. 12 is a view showing a flowchart of a reproduction process.

FIG. 12 is a view showing a flowchart of the reproduction process. Referring to FIG. 12, in the reproduction process, processing in step S211 is initially performed.

In step S211, control unit 510 determines whether or not a list display operation is made. Here, the list display operation is interface operation M for causing display unit 530 to display a list of a plurality of titles respectively corresponding to the plurality of image-recorded contents stored in storage unit 520. If YES in step S211, control unit 510 advances the process to step S212. If NO in step S211, the processing in step S211 is performed again. Here, on the assumption that a list display operation is made, control unit 510 advances the process to step S212.

In step S212, list image display processing is performed. In the list image display processing, control unit 510 generates a list image MG200N described below utilizing VDP 532, based on the plurality of headword-related data, and causes display unit 530 to display list image MG200N. List image MG200N is generated based on the "titles" indicated in the plurality of headword-related data respectively corresponding to the plurality of image-recorded contents stored in storage unit 520. Then, the processing in step S212 is terminated.

FIG. 13 is a view showing list image MG200N as an example. Referring to FIG. 13, a recorded-image list image MG210N is arranged in list image MG200N. Recorded-image list image MG210N displays a plurality of title data. The plurality of title data is data indicating the titles of the plurality of image-recorded contents stored in storage unit 520. In recorded-image list image MG210N, the "No." represents a number for identifying any of the titles of the plurality of image-recorded contents.

Referring to FIG. 12 again, after the processing in step S212, control unit 510 advances the process to step S213.

In step S213, control unit 510 determines whether or not a reproduction operation is made. Here, the reproduction operation is, as an example, an operation of depressing a numeric button included in button group 542 for inputting a number displayed in recorded-image list image MG210N. That is, the reproduction operation is an operation for selecting any of the plurality of title data displayed in recorded-image list image MG210N. If YES in step S213, control unit 510 advances the process to step S214. If NO in step S213, the processing in step S213 is performed again. Here, on the assumption that a reproduction operation is made, control unit 510 advances the process to step S214. It is herein assumed that the reproduction operation is an operation of depressing a numeric button for inputting the number "1".

In step S214, control unit 510 performs reproduction display processing and elapsed time measurement processing P. Each of the reproduction display processing and elapsed time measurement processing P is performed independent of other processing. Then, the processing in step S214 is terminated.

In the reproduction display processing, control unit 510 reads an image-recorded content having a title indicated by the title data selected by the reproduction operation from storage unit 520 and reproduces the image-recorded content, and causes display unit 530 to display an image of the image-recorded content being reproduced (hereinafter also referred to as a reproduced image) utilizing VDP 532. Here, if the reproduction operation is an operation of depressing a numeric button for inputting the number "1", the image-recorded content to be reproduced is a content titled "English Conversation Course AA". In this case, display unit 530 displays an image at the time of reproduction MG200 described below.

Elapsed time measurement processing P is processing for measuring elapsed time of the reproduction display processing. That is, the elapsed time measured by elapsed time measurement processing P is time that has elapsed since the reproduced image, which is the image of the image-recorded content having the title indicated by the title data selected by the reproduction operation, is displayed on display unit 530.

Figure 14:
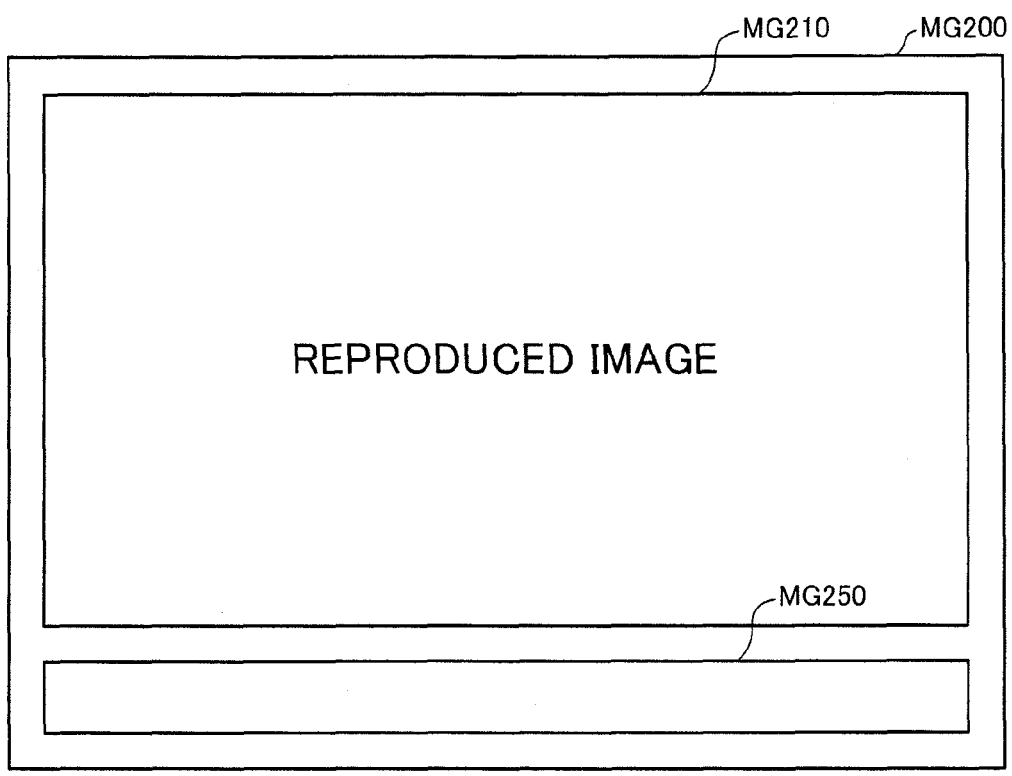
FIG. 14 is a view showing an image at the time of reproduction as an example.

FIG. 14 is a view showing image at the time of reproduction MG200 as an example. Referring to FIG. 14, in image at the time of reproduction MG200, a reproduced image MG210 is displayed. Reproduced image MG210 is a reproduced image displayed by the reproduction display processing. Further, a search character input box MG250 is arranged in reproduced image MG210. Search character input box MG250 is a box for inputting characters by interface operation M. Hereinafter, characters input in search character input box MG250 by interface operation M will also be referred to as search target characters.

Referring to FIG. 12 again, after the processing in step S214, control unit 510 advances the process to step S215.

In step S215, control unit 510 determines whether or not read target data is stored in storage unit 520. Here, the read target data is headword-related data indicating the title of the image-recorded content being reproduced by the reproduction display processing. If YES in step S215, control unit 510 advances the process to step S216. If NO in step S215, control unit 510 advances the process to step S228 described later. Here, on the assumption that headword-related data D100B in FIG. 11 as the read target data is stored in storage unit 520, control unit 510 advances the process to step S216.

In step S216, data read processing is performed. In the data read processing, control unit 510 reads, from storage unit 520, the headword-related data corresponding to the image-recorded content being reproduced by the reproduction display processing. It is herein assumed that the image-recorded content being reproduced by the reproduction display processing is the content titled "English Conversation Course AA". In this case, headword-related data D100B in FIG. 11 is read by control unit 510. Then, control unit 510 advances the process to step S217.

In step S217, searched information display processing is performed. The searched information display processing is processing for displaying searched information. Here, the searched information is information searched for in an image-recording period or a reproduction period. The image-recording period is a period in which the image-recorded content being displayed on display unit 530 by the reproduction display processing was recorded by the recorded-image storage processing performed in step S110 of FIG. 3. The reproduction period is a period in which the image-recorded content is being reproduced by the reproduction display processing performed in step S214.

Specifically, in the searched information display processing, control unit 510 generates a searched information display image utilizing VDP 532, based on the headword-related data read by the processing in step S216, and causes display unit 530 to display the generated searched information display image together with the reproduced image. The searched information display image is an image displaying a headword and information of an information acquisition source indicated in the read headword-related data.

It is herein assumed that the headword-related data is headword-related data D100B in FIG. 11. In this case, the searched information display image is a searched information display image MG260 described below. In this case, display unit 530 displays an image at the time of reproduction MG200A described below in which searched information display image MG260 described below is displayed in addition to the reproduced image. Then, the processing in step S217 is terminated.

Figure 15:
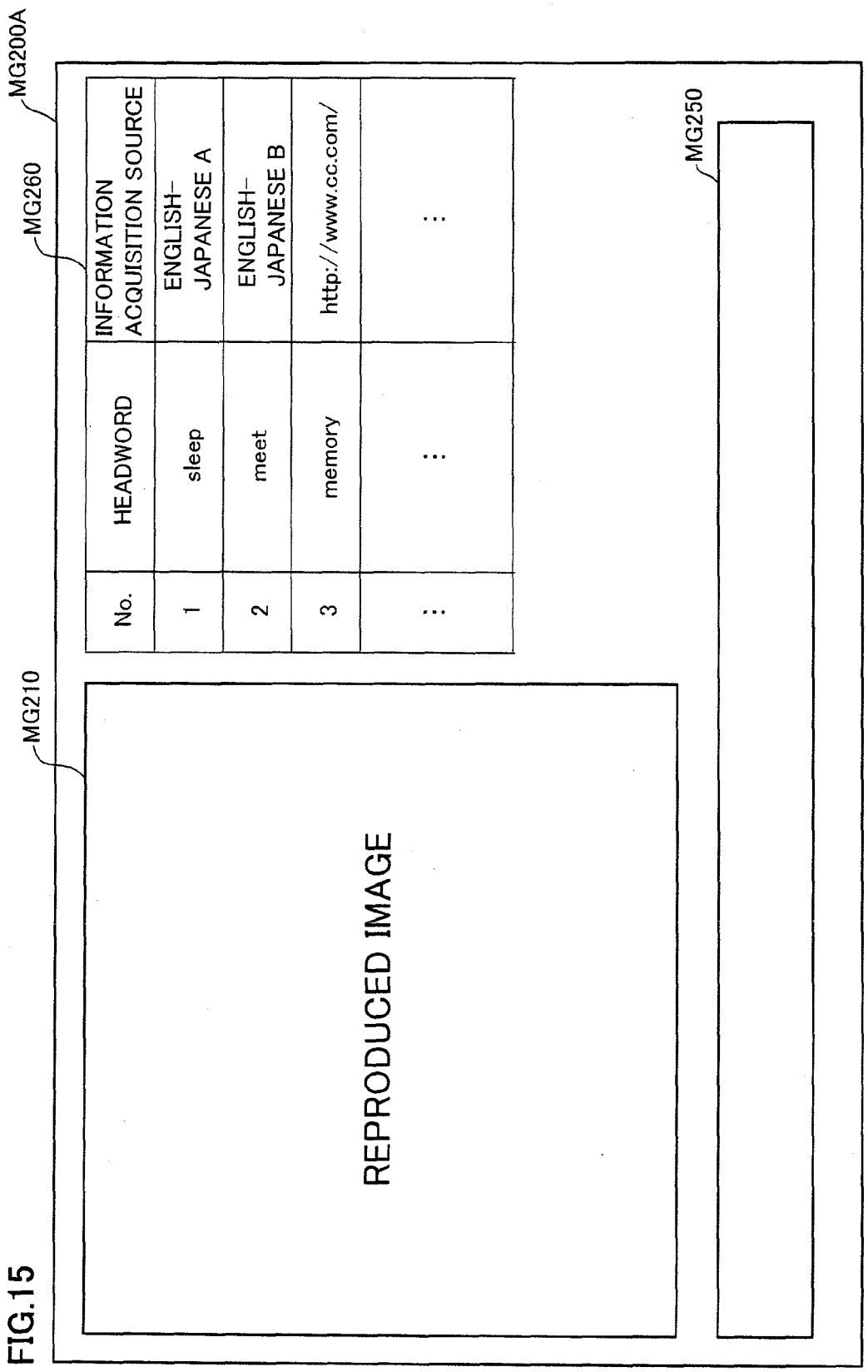
FIG. 15 is a view showing an image at the time of reproduction as an example.

FIG. 15 is a view showing image at the time of reproduction MG200A as an example. Referring to FIG. 15, when compared with image at the time of reproduction MG200 in FIG. 14, image at the time of reproduction MG200A is different in that a display region for reproduced image MG210 is smaller, and that searched information display image MG260 is further arranged. Since image at the time of reproduction MG200A is otherwise the same as image at the time of reproduction MG200, detailed description will not be repeated.

Searched information display image MG260 displays a plurality of searched information data. In searched information display image MG260, the "No." represents a number for identifying any of the plurality of searched information data. Each of the plurality of searched information data includes a headword and an information acquisition source corresponding to the headword indicated in headword-related data D100B. As described above, the information acquisition source is information for identifying a source for acquiring the detailed information.

Each of the plurality of searched information data displayed in searched information display image MG260 can be selected by an operation of depressing a numeric button included in button group 542.

Referring to FIG. 12 again, after the processing in step S217, control unit 510 advances the process to step S221.

In step S221, it is determined whether or not a detail search operation P is made. Detail search operation P is interface operation M for searching for the detailed information of a headword. As an example, detail search operation P is an operation of depressing a numeric button included in button group 542 for inputting a number displayed in searched information display image MG260. That is, the detail search operation is an operation for selecting any of the plurality of searched information data displayed in searched information display image MG260.

If YES in step S221, control unit 510 advances the process to step S224. If NO in step S221, control unit 510 advances the process to step S228 described later. Here, on the assumption that detail search operation P is made, control unit 510 advances the process to step S224. It is herein assumed that detail search operation P is an operation of depressing a numeric button for inputting the number "1".

In step S224, detail search processing P is performed. In detail search processing P, control unit 510 searches the information acquisition source indicated in the searched information data selected by detail search operation P, for the detailed information of the headword indicated in the selected searched information data. It is herein assumed that the searched information data selected by detail search processing P is, as an example, the searched information data numbered "1" displayed in searched information display image MG260.

In this case, control unit 510 searches the dictionary data named "English-Japanese A" as an information acquisition source indicated in the searched information data numbered "1", for the detailed information of the headword "sleep". If the searched information data selected by detail search operation P is, for example, the searched information data numbered "3" displayed in searched information display image MG260, control unit 510 accesses a website with the URL "http://www.cc.com/" utilizing communication unit 562, and searches for and acquires the detailed information of a headword "memory". Then, control unit 510 advances the process to step S225.

In step S225, detail display processing P is performed. In detail display processing P, control unit 510 generates a detail display image utilizing VDP 532, and causes display unit 530 to display the generated detail display image together with the reproduced image. The detail display image is an image displaying the detailed information of the headword indicated in the selected searched information data. It is herein assumed that the selected searched information data is, as an example, the searched information data numbered "1" displayed in searched information display image MG260. In this case, display unit 530 displays an image at the time of reproduction MG200B described below in which a detail display image MG260A described below is displayed in addition to the reproduced image.

Figure 16:
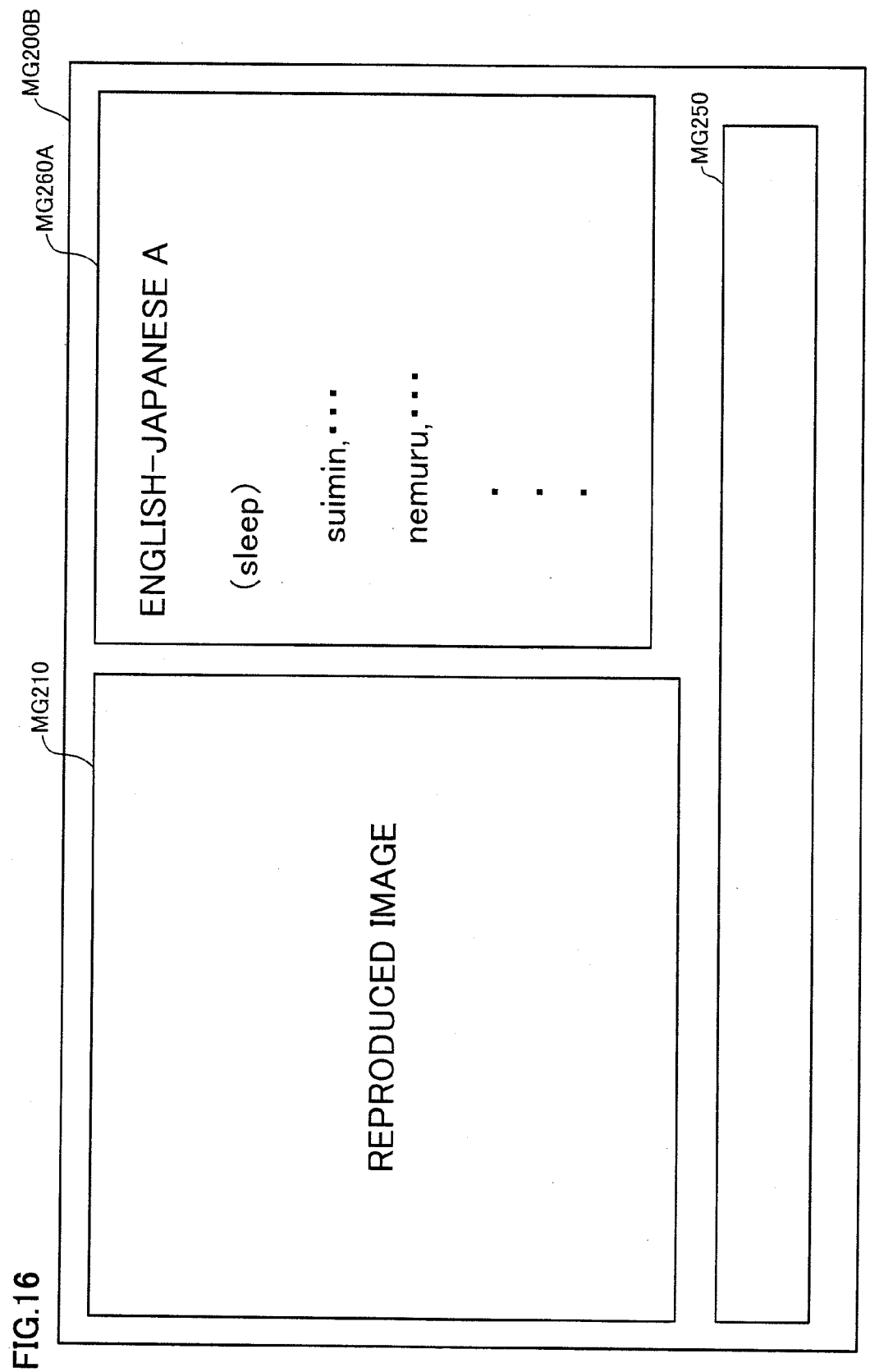
FIG. 16 is a view showing an image at the time of reproduction as an example.

FIG. 16 is a view showing image at the time of reproduction MG200B as an example. Referring to FIG. 16, when compared with image at the time of reproduction MG200A in FIG. 15, image at the time of reproduction MG200B is different in that detail display image MG260A is arranged instead of searched information display image MG260. Since image at the time of reproduction MG200B is otherwise the same as image at the time of reproduction MG200A, detailed description will not be repeated.

Since the information displayed in detail display image MG260A is the same as the information displayed in detail display image MG160A in FIG. 6, detailed description will not be repeated.

If the selected searched information data is, for example, the searched information data numbered "3" displayed in searched information display image MG260, detail display image MG260A displays an information acquisition source (URL "http://www.cc.com/") indicated in the searched information data numbered "3", the headword "memory" indicated in the searched information data numbered "3", and the detailed information of the headword "memory" acquired from the website with the URL "http://www.cc.com/".

Referring to FIG. 12 again, in detail display processing P in step S225, control unit 510 causes temporary storage unit 522 to store the current time being measured by elapsed time measurement processing P (hereinafter also referred to as searched information display time P). Searched information display time P is time at which the detailed information searched for is displayed while the reproduced image as a moving image is being displayed. If searched information display time P is already stored in temporary storage unit 522, the latest searched information display time P is stored in an overwriting manner.

It is assumed that searched information display time P is, as an example, 16 minutes 50 seconds. In this case, searched information display time P indicates that 16 minutes 50 seconds have elapsed since the start of the reproduction display processing. That is, searched information display time P "16 minutes 50 seconds" indicates that the detailed information searched for is displayed at a point where 16 minutes 50 seconds have elapsed from the beginning of the image-recorded content being reproduced by the reproduction display processing. Then, control unit 510 advances the process to step S225N.

In step S225N, control unit 510 sets a detail flag P to ON. Detail flag P is a flag indicating whether or not the detailed information is being displayed by detail display processing P. If detail flag P is ON, it indicates that the detailed information is being displayed by detail display processing P. If detail flag P is OFF, it indicates that the detailed information is not being displayed by detail display processing P. Detail flag P is stored in storage unit 520 beforehand. Then, control unit 510 advances the process to step S226.

In step S226, headword storage processing P is performed. In headword storage processing P, control unit 510 causes storage unit 520 to store headword-related data in which the title of the image-recorded content being reproduced by the reproduction display processing, a headword corresponding to the detailed information searched for (hereinafter also referred to as searched detailed information), information for identifying a source for acquiring the searched detailed information, and searched information display time P stored in temporary storage unit 522 are associated.

If storage unit 520 stores headword-related data indicating the title of the image-recorded content being reproduced by the reproduction display processing, and a headword corresponding to the searched detailed information is not displayed in the headword-related data, control unit 510 adds, to the headword-related data, data in which a headword corresponding to the searched detailed information, information for identifying a source for acquiring the searched detailed information, and searched information display time P stored in temporary storage unit 522 are associated.

It is herein assumed that storage unit 520 stores headword-related data D100B in FIG. 11 indicating the title "English Conversation Course AA" of the image-recorded content being reproduced by the reproduction display processing, and that a headword corresponding to the searched detailed information is "sleep". In this case, the headword "sleep" corresponding to the searched detailed information is displayed in headword-related data D100B. Therefore, the data in which a headword corresponding to the searched detailed information, information for identifying a source for acquiring the searched detailed information, and searched information display time P stored in temporary storage unit 522 are associated is not added to headword-related data D100B. Then, control unit 510 advances the process to step S227.

In step S227, information acquisition source storage processing P is performed. Information acquisition source storage processing P is processing for storing the information for identifying the source for acquiring the detailed information displayed by detail display processing P in step S225.

In information acquisition source storage processing P, control unit 510 causes storage unit 520 to store information acquisition source identification data in which the title of the image-recorded content being reproduced by the reproduction display processing is associated with the information for identifying the source for acquiring the detailed information. If storage unit 520 stores information acquisition source identification data indicating the title of the image-recorded content being reproduced by the reproduction display processing, and the information for identifying the source for acquiring the detailed information is not displayed in the information acquisition source identification data, control unit 510 adds the information for identifying the source for acquiring the detailed information, to the information acquisition source identification data.

It is herein assumed that storage unit 520 stores information acquisition source identification data D110A in FIG. 10 indicating the title "English Conversation Course AA" of the image-recorded content being reproduced by the reproduction display processing, and that the information for identifying the source for acquiring the detailed information is the name "English-Japanese A" of the dictionary data. In this case, the name "English-Japanese A" of the dictionary data is displayed in information acquisition source identification data D110A, as the information for identifying the source for acquiring the detailed information. Therefore, the information for identifying the source for acquiring the detailed information is not added to information acquisition source identification data D110A. Then, control unit 510 advances the process to step S228.

In step S228, control unit 510 determines whether or not a character input operation P is made. Character input operation P is interface operation M for inputting characters in search character input box MG250. If characters have been input in search character input box MG250, character input operation P is interface operation M for modifying the characters input in search character input box MG250. If YES in step S228, control unit 510 advances the process to step S233. If NO in step S228, control unit 510 advances the process to step S250 described later. Here, on the assumption that character input operation P is made, control unit 510 advances the process to step S233.

It is herein assumed that search target characters input in search character input box MG250 by character input operation P represent, as an example, an English word "come". It is assumed that the search target characters input in search character input box MG250 by the character input operation represent, as an example, a word whose meaning is unknown to the user that the user encounters while viewing the reproduced image displayed on display unit 530. That is, the search target characters represent a word to be learned by the user.

In step S233, control unit 510 determines whether or not a search operation has been made. The search operation is interface operation M for searching for information for acquiring the detailed information of the search target characters (hereinafter also referred to as detail acquiring information). If YES in step S233, control unit 510 advances the process to step S234. If NO in step S233, the processing in step S233 is performed again. Here, on the assumption that a search operation has been made, control unit 510 advances the process to step S234.

In step S234, search processing is performed. Since local search processing and network search processing are performed in the search processing as in the processing in step S114 of FIG. 3, detailed description will not be repeated. It is assumed that a plurality of dictionary data including the search target characters as a headword and a plurality of dictionary data including a headword including the search target characters are searched for by this processing. It is further assumed that a plurality of net detail acquiring information for acquiring the search target characters are received from the search server. Then, control unit 510 advances the process to step S235.

In step S235, search result display processing P is performed. In search result display processing P, control unit 510 generates a search result display image utilizing VDP 532, and causes display unit 530 to display the generated search result display image together with the reproduced image. The search result display image is an image displaying the result of the local search processing and the result of the network search processing.

It is herein assumed that a plurality of dictionary data including the search target characters as a headword and a plurality of dictionary data including a headword including the search target characters are searched for by the local search processing, and that a plurality of net detail acquiring information are received by the network search processing. In this case, display unit 530 displays an image at the time of reproduction MG200C described below in which a search result display image MG260C described below is displayed in addition to the reproduced image. Search result display image MG260C is an image displaying names of the dictionary data searched for by the local search processing, and the net detail acquiring information received by the network search processing. Then, the processing in step S235 is terminated.

Figure 17:
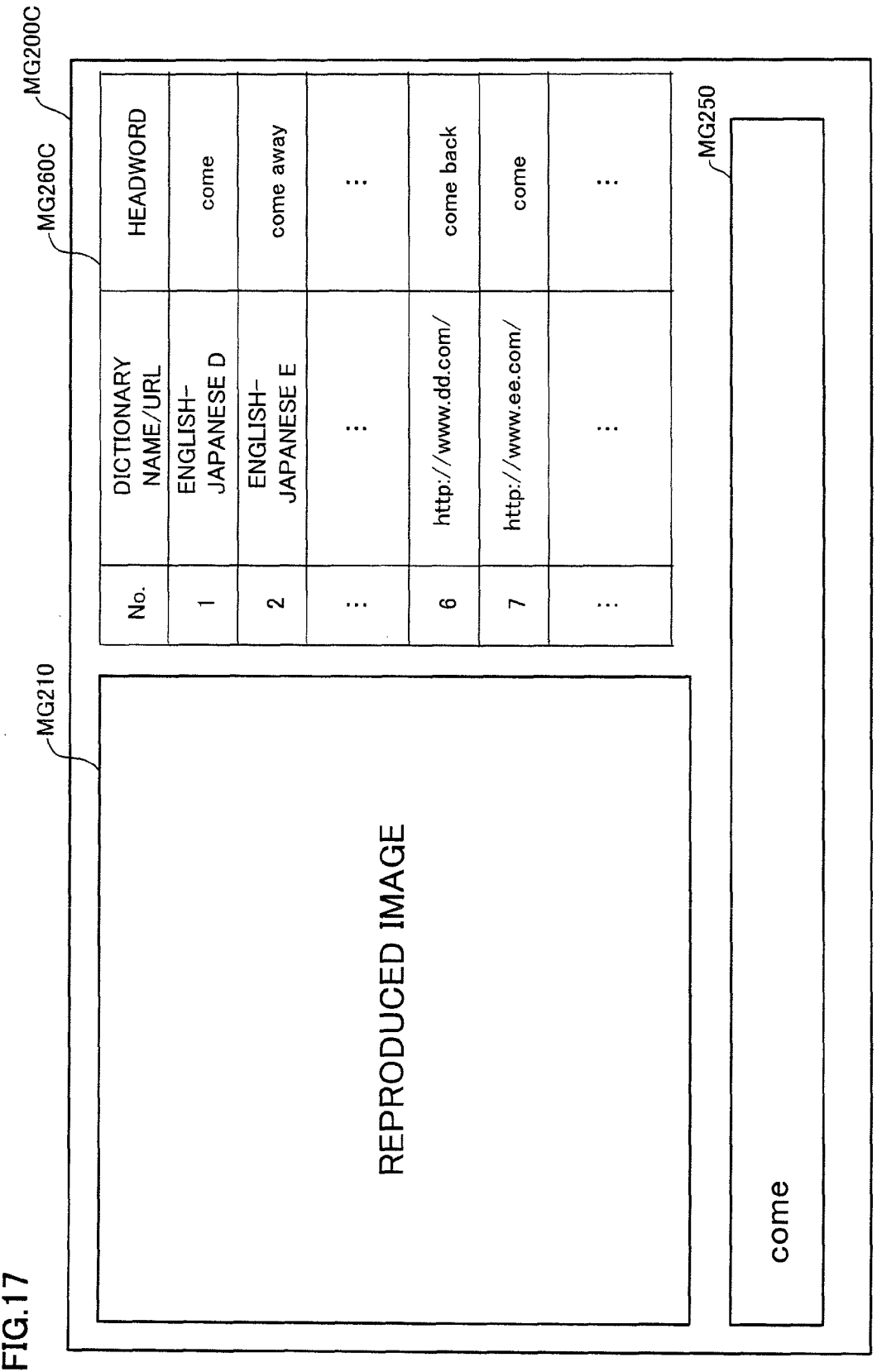
FIG. 17 is a view showing an image at the time of reproduction as an example.

FIG. 17 is a view showing image at the time of reproduction MG200C as an example. Referring to FIG. 17, when compared with image at the time of reproduction MG200B in FIG. 16, image at the time of reproduction MG200C is different in that search result display image MG260C is arranged instead of detail display image MG260A, and that search target characters "come" are input in search character input box MG250. Since image at the time of reproduction MG200C is otherwise the same as image at the time of reproduction MG200B, detailed description will not be repeated.

Since the information and data displayed in search result display image MG260C are the same as those described in search result display image MG160 in FIG. 5, detailed description will not be repeated. Each of a plurality of headword data displayed in search result display image MG260C can be selected by an operation of depressing a numeric button included in button group 542.

Referring to FIG. 12 again, after the processing in step S235, control unit 510 advances the process to step S236.

In step S236, control unit 510 sets detail flag P described above to OFF. Further, control unit 510 sets a detail flag PN to OFF. Detail flag PN is a flag indicating whether or not the detailed information is being displayed by detail display processing PN described later. If detail flag PN is ON, it indicates that the detailed information is being displayed by detail display processing PN. If detail flag PN is OFF, it indicates that the detailed information is not being displayed by detail display processing PN. Detail flag PN is stored in storage unit 520 beforehand. Then, control unit 510 advances the process to step S241.

In step S241, control unit 510 determines whether or not a detail search operation is made. The detail search operation is interface operation M for searching for the detailed information of the headword. As an example, the detail search operation is an operation of depressing a numeric button included in button group 542 for inputting a number displayed in search result display image MG260C. That is, the detail search operation is an operation for selecting any of the plurality of headword data displayed in search result display image MG260C. If YES in step S241, control unit 510 advances the process to step S244. If NO in step S241, the processing in step S228 is performed again. Here, on the assumption that a detail search operation is made, control unit 510 advances the process to step S244. It is herein assumed that the detail search operation is an operation of depressing a numeric button for inputting the number "1".

In step S244, detail search processing is performed. Since the detail search processing is the same as the processing in step S124 of FIG. 3, detailed description will not be repeated. Then, control unit 510 advances the process to step S245.

In step S245, detail display processing PN is performed. In detail display processing PN, control unit 510 generates a detail display image utilizing VDP 532, and causes display unit 530 to display the generated detail display image together with the reproduced image. The detail display image is an image displaying the detailed information of the headword indicated in the selected headword data. It is herein assumed that the selected headword data is, as an example, the headword data numbered "1" displayed in search result display image MG260C. In this case, display unit 530 displays an image at the time of reproduction MG200D described below in which a detail display image MG260D described below is displayed in addition to the reproduced image.

Figure 18:
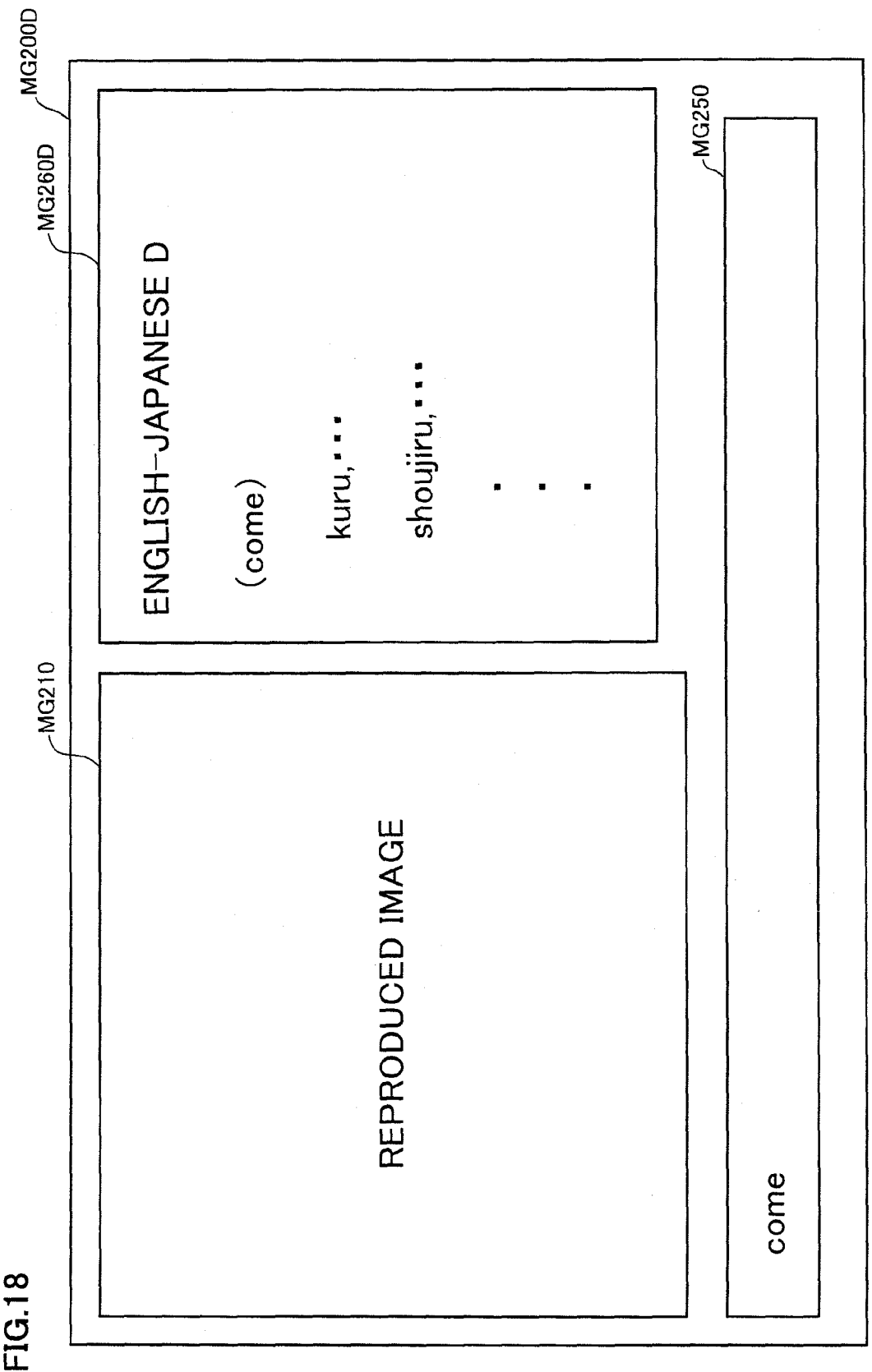
FIG. 18 is a view showing an image at the time of reproduction as an example.

FIG. 18 is a view showing image at the time of reproduction MG200D as an example. Referring to FIG. 18, when compared with image at the time of reproduction MG200C in FIG. 17, image at the time of reproduction MG200D is different in that detail display image MG260D is arranged instead of search result display image MG260C. Since image at the time of reproduction MG200D is otherwise the same as image at the time of reproduction MG200C, detailed description will not be repeated.

Since the information displayed in detail display image MG260D is the same as that described in detail display image MG160A in FIG. 6, detailed description will not be repeated.

Referring to FIG. 12 again, in detail display processing PN in step S245, control unit 510 causes temporary storage unit 522 to store the current time being measured by elapsed time measurement processing P (hereinafter also referred to as searched information display time P). Searched information display time P is time at which the detailed information searched for is displayed while the reproduced image as a moving image is being displayed. If searched information display time P is already stored in temporary storage unit 522, control unit 510 causes the latest searched information display time P to be stored in an overwriting manner.

It is assumed that searched information display time P is, as an example, "16 minutes 50 seconds". In this case, searched information display time P indicates that "16 minutes 50 seconds" have elapsed since the start of the reproduction display processing. That is, searched information display time P "16 minutes 50 seconds" indicates that the detailed information searched for is displayed at a point where 16 minutes 50 seconds have elapsed from the beginning of the image-recorded content being reproduced by the reproduction display processing. Then, control unit 510 advances the process to step S245N.

In step S245N, control unit 510 sets detail flag PN to ON. Detail flag PN is a flag indicating whether or not the detailed information is being displayed by detail display processing PN. If detail flag PN is ON, it indicates that the detailed information is being displayed by detail display processing PN. If detail flag PN is OFF, it indicates that the detailed information is not being displayed by detail display processing PN. Then, control unit 510 advances the process to step S246.

In step S246, headword storage processing P is performed. Since headword storage processing P in step S246 is the same as headword storage processing P in step S226, detailed description will not be repeated.

It is herein assumed that storage unit 520 stores headword-related data D100B in FIG. 11 indicating the title "English Conversation Course AA" of the image-recorded content being reproduced by the reproduction display processing, and that the headword corresponding to the searched detailed information is "come". In this case, the headword "come" corresponding to the searched detailed information is not displayed in headword-related data D100B. Therefore, control unit 510 adds, to headword-related data D100B, data in which the headword corresponding to the searched detailed information, information for identifying a source for acquiring the searched detailed information, and searched information display time P stored in temporary storage unit 522 are associated. In this case, headword-related data D100B stored in storage unit 520 becomes headword-related data D100C described below. Then, the processing in step S246 is terminated.

FIG. 19 is a view showing headword-related data D100C as an example. Referring to FIG. 19, if the data is added by the processing in step S246, the data is added at a position that allows the searched information display times indicated in headword-related data D100C to be arranged in an increasing order.

Referring to FIG. 12 again, after the processing in step S246, control unit 510 advances the process to step S247.

In step S247, information acquisition source storage processing P is performed. Since information acquisition source storage processing P in step S247 is the same as information acquisition source storage processing P in step S227, detailed description will not be repeated.

It is herein assumed that storage unit 520 stores information acquisition source identification data D110A in FIG. 10 indicating the title "English Conversation Course AA" of the image-recorded content being reproduced by the reproduction display processing, and that the information for identifying the source for acquiring the detailed information is the name "English-Japanese D" of the dictionary data. In this case, the name "English-Japanese D" of the dictionary data is not displayed in information acquisition source identification data D110A, as the information for identifying the source for acquiring the detailed information. Therefore, control unit 510 adds the information for identifying the source for acquiring the detailed information, to information acquisition source identification data D110A. In this case, information acquisition source identification data D110A stored in storage unit 520 becomes information acquisition source identification data D110C described below. Then, the processing in step S247 is terminated.

Figures 20, 21:
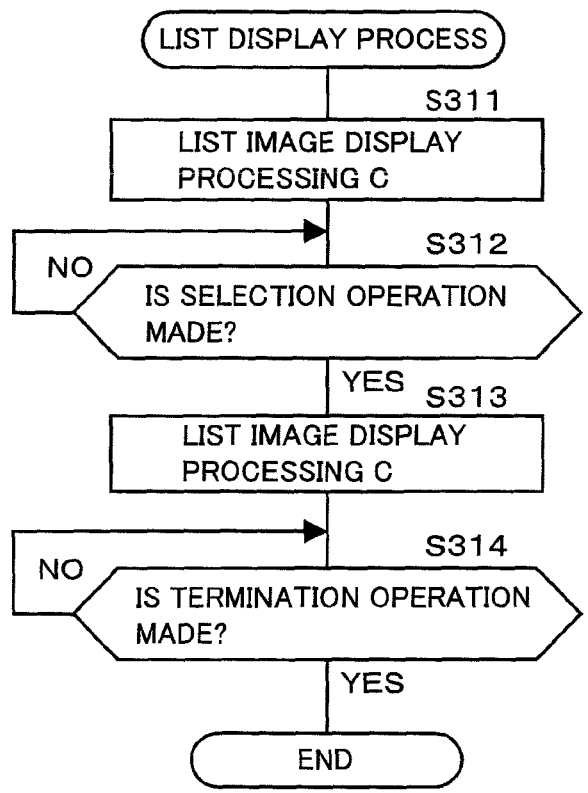
FIG. 20 is a view showing information acquisition source identification data as an example.
FIG. 21 is a view showing a list display process as an example.

FIG. 20 is a view showing information acquisition source identification data D110C as an example.

Referring to FIG. 12 again, after the processing in step S247, the processing in step S228 is performed again.

It is herein assumed that determination as NO is made in step S228, and that control unit 510 advances the process to step S250.

In step S250, control unit 510 determines whether or not a reproduction termination condition is satisfied. Here, the reproduction termination condition is a condition that reproduction of the image-recorded content being reproduced by the reproduction display processing is terminated. The reproduction termination condition is not limited to the condition described above, and may be, for example, a condition that interface operation M for terminating the reproduction of the image-recorded content is made. If YES in step S250, control unit 510 terminates the reproduction display processing and elapsed time measurement processing P described above, and thus the reproduction process ends. If NO in step S250, control unit 510 advances the process to step S251. Here, on the assumption that the reproduction termination condition is not satisfied, control unit 510 advances the process to step S251.

In step S251, control unit 510 determines whether or not detail flag P is OFF. If YES in step S251, control unit 510 advances the process to step S252. If NO in step S251, the processing in step S228 is performed again.

In step S252, control unit 510 determines whether or not detail flag PN described above is OFF. If YES in step S252, control unit 510 advances the process to step S253. If NO in step S252, the processing in step S228 is performed again.

In step S253, control unit 510 determines whether or not the searched information is being displayed on display unit 530 by the searched information display processing in step S217. If YES in step S253, the processing in step S221 is performed again. If NO in step S253, control unit 510 advances the process to step S254.

In step S254, control unit 510 determines whether or not the search result is being displayed on display unit 530 by search result display processing P in step S235. If YES in step S254, the processing in step S241 is performed again. If NO in step S254, the processing in step S228 is performed again.

(Display of Headword Searched for in Reproduction Period Only)

Next, a process in a case where the detailed information has not been searched for in the image-recording period will be described. That is, this is the case where, in the image-recording process of FIG. 3, determination as NO is made in steps S112 and S128 before determination as YES is made in step S130. In this case, at the time when the image-recording process of FIG. 3 ends, storage unit 520 does not store headword-related data and information acquisition source identification data of an image-recording target content.

It is assumed that search processing for the detailed information is performed while an image-recorded content for which corresponding headword-related data and information acquisition source identification data have not been stored is being reproduced in the reproduction process of FIG. 12. In this case, by performing processing such as steps S226, S227, S246, S247 and the like in the reproduction process of FIG. 12, headword-related data and information acquisition source identification data corresponding to the image-recorded content being reproduced are stored in storage unit 520.

Thereafter, by reproducing the image-recorded content again in the reproduction process of FIG. 12, a headword whose detailed information has been searched for during reproduction of the image-recorded content can be displayed, even in the case where the detailed information has not been searched for in the image-recording period.

(Display of Headword)

Next, a process for displaying a list of headwords whose detailed information has been displayed (hereinafter also referred to as a list display process) will be described. The list display process is a process performed when interface operation M for displaying a list of headwords whose detailed information has been displayed is made. It is herein assumed that storage unit 520 stores a plurality of headword-related data respectively corresponding to a plurality of image-recorded contents, and that storage unit 520 stores a plurality of information acquisition source identification data respectively corresponding to the plurality of image-recorded contents.

FIG. 21 is a view showing the list display process as an example. Referring to FIG. 21, in the list display process, processing in step S311 is initially performed.

In step S311, list image display processing C is performed. In list image display processing C, control unit 510 generates a list image MG400 described below utilizing VDP 532, based on the plurality of headword-related data, and causes display unit 530 to display list image MG400. List image MG400 is generated based on the "titles" indicated in the plurality of headword-related data respectively corresponding to the plurality of image-recorded contents stored in storage unit 520. Then, the processing in step S311 is terminated.

FIG. 22 is a view showing list image MG400 as an example. Referring to FIG. 22, a displayed headword selection image MG410 is arranged in list image MG400. In displayed headword selection image MG410, the "titles" indicated in the plurality of headword-related data respectively associated with a plurality of numbers are displayed. It is to be noted that the number "0" is the number for displaying all headwords indicated in all headword-related data stored in storage unit 520.

Referring to FIG. 21 again, after the processing in step S311, control unit 510 advances the process to step S312.

In step S312, control unit 510 determines whether or not a selection operation is made. The selection operation is, as an example, an operation of depressing a numeric button included in button group 542 for inputting a number displayed in displayed headword selection image MG410. If YES in step S312, control unit 510 advances the process to step S313. If NO in step S312, the processing in step S312 is performed again. Here, on the assumption that a selection operation is made, control unit 510 advances the process to step S313. It is herein assumed that the selection operation is an operation of depressing a numeric button for inputting the number "1".

In step S313, headword display processing is performed. In the headword display processing, a list of headwords based on the selection operation is displayed. It is herein assumed that the selection operation is an operation of depressing a numeric button for inputting the number "1". In this case, control unit 510 generates a list image displaying all headwords displayed in the headword-related data indicating the title "English Conversation Course AA" utilizing VDP 532, and causes display unit 530 to display the list image. It is herein assumed that the headword-related data indicating "English Conversation Course AA" is headword-related data D100C in FIG. 19. In this case, display unit 530 displays a list image MG400A described below. Then, the processing in step S313 is terminated.

Figure 23:
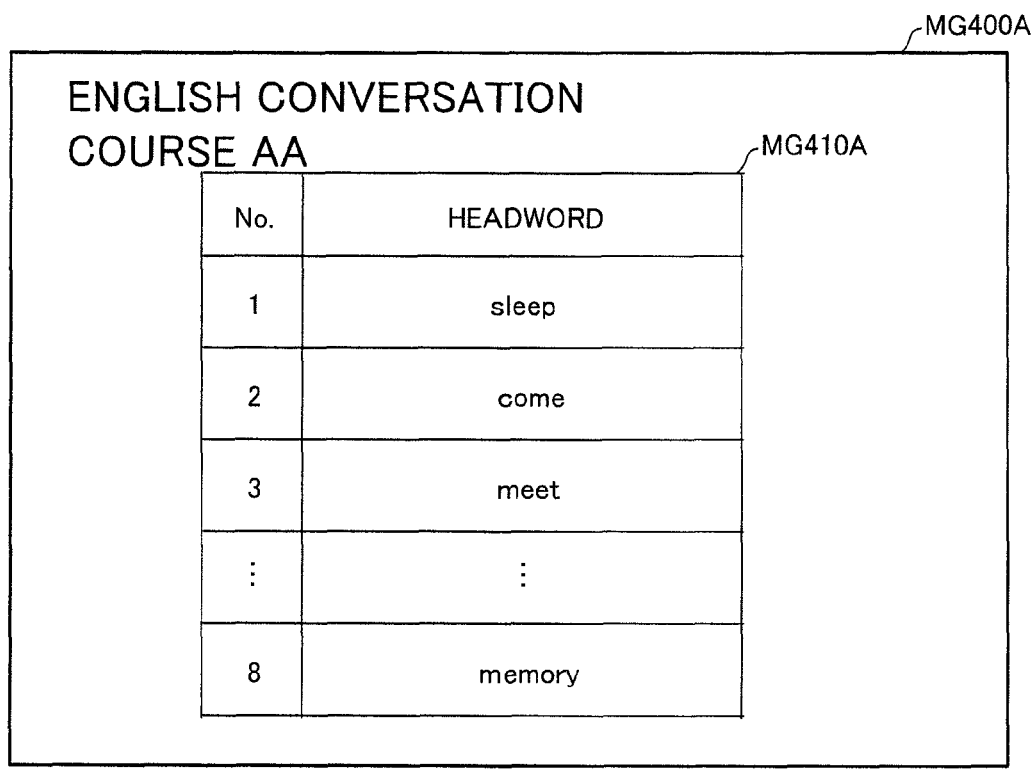
FIG. 23 is a view showing a list image as an example.

FIG. 23 is a view showing list image MG400A as an example. Referring to FIG. 23, a headword list image MG410A is arranged in list image MG400A. Headword list image MG410A indicates a plurality of headwords whose detailed information has been searched for in the image-recording period or the reproduction period of the content titled "English Conversation Course AA". If a number corresponding to a headword is input while list image MG400A is being displayed, the detailed information of the corresponding headword is displayed. Further, if interface operation M for returning to an initial image is made while list image MG400A is being displayed, the processing in step S311 is performed again.

It is to be noted that a process based on a selection operation for inputting the number "0" in the headword display processing in step S313 is as follows. Specifically, control unit 510 generates a list image MG400B displaying all headwords indicated in all headword-related data stored in storage unit 520, and causes display unit 530 to display list image MG400B.

FIG. 24 is a view showing list image MG400B as an example. Referring to FIG. 24, a headword list image MG410B is arranged in list image MG400B.

Headword list image MG410B indicates a plurality of headwords whose detailed information has been searched for in the image-recording period or the reproduction period of the contents. As indicated in headword list image MG410B, the headwords include not only an English word but also Japanese and the like. For example, if a Japanese headword is input to search for a word translated into a language other than Japanese (for example, French), the Japanese headword is included. Further, for example, if the explanation and the like of a Japanese headword is searched for, the Japanese headword is included.

It is to be noted that, if a number corresponding to a headword is input while list image MG400B is being displayed, the detailed information of the corresponding headword is displayed. Further, if interface operation M for returning to an initial image is made while list image MG400B is being displayed, the processing in step S311 is performed again.

Referring to FIG. 21 again, after the processing in step S313, control unit 510 advances the process to step S314.

In step S314, control unit 510 determines whether or not a termination operation is made. Here, the termination operation is interface operation M for terminating the list display process. If YES in step S314, the list display process ends. If NO in step S314, the processing in step S314 is performed again.

As has been described above, in the present embodiment, if the detailed information is searched for in at least one of the image-recording period and the reproduction period, storage unit 520 stores a headword corresponding to the detailed information searched for, and image information (for example, a title) identifying a video content being displayed on display unit 530 in the period in which the detailed information has been searched for (the image-recording period or the reproduction period), in an associated manner.

Then, when an image-recorded content identified by the image information (for example, the title) stored in storage unit 520 is reproduced, display unit 530 displays, in the reproduction period of the image-recorded content, the headword whose detailed information has been searched for in at least one of the image-recording period and the reproduction period of the image-recorded content. The displayed headword is a headword based on an interface operation by the user.

Therefore, by reproducing the image-recorded content, the headword whose detailed information has been searched for in at least one of the image-recording period and the reproduction period of the image-recorded content can be easily confirmed. The headword whose detailed information has been searched for is a headword based on an interface operation by the user, and a word to be learned by the user. Consequently, there is achieved an effect that allows the user to efficiently learn a word to be learned.

Second Embodiment (Switching of Headword Being Reproduced)

Next, a process for switching a headword displayed during reproduction of an image-recorded content according to elapsed time (hereinafter also referred to as a reproduction process A) will be described.

Since the configuration of translation apparatus 500 in the present embodiment is the same as the configuration described in the first embodiment, detailed description will not be repeated. It is herein assumed that headword-related data D100C in FIG. 19, information acquisition source identification data D110C in FIG. 20, and an image-recorded content titled "English Conversation Course AA" indicated in headword-related data D100C are stored in storage unit 520 by performing the image-recording process of FIG. 3 and the reproduction process of FIG. 12. Reproduction time of the image-recorded content titled "English Conversation Course AA" is 30 minutes, as indicated in headword-related data D100C.

It is herein assumed that the reproduction time of the image-recorded content is divided into, as an example, but not limited to, three periods. Hereinafter, the three periods will be referred to as first, second, and third periods, respectively. It is assumed that the first period is a period from time at which reproduction of the image-recorded content is stated to time at which "10 minutes 00 seconds" have elapsed since the start of the reproduction of the image-recorded content. It is assumed that the second period is a period from time at which "10 minutes 01 seconds" have elapsed since the start of the reproduction of the image-recorded content to time at which "20 minutes 00 seconds" have elapsed since the start of the reproduction of the image-recorded content. It is assumed that the third period is a period from time at which "20 minutes 01 seconds" have elapsed since the start of the reproduction of the image-recorded content to time at which "30 minutes 00 seconds" have elapsed since the start of the reproduction of the image-recorded content. It is to be noted that the first, second, and third periods are not limited to periods as described above. For example, the first, second, and third periods may have different lengths.

Figure 25:
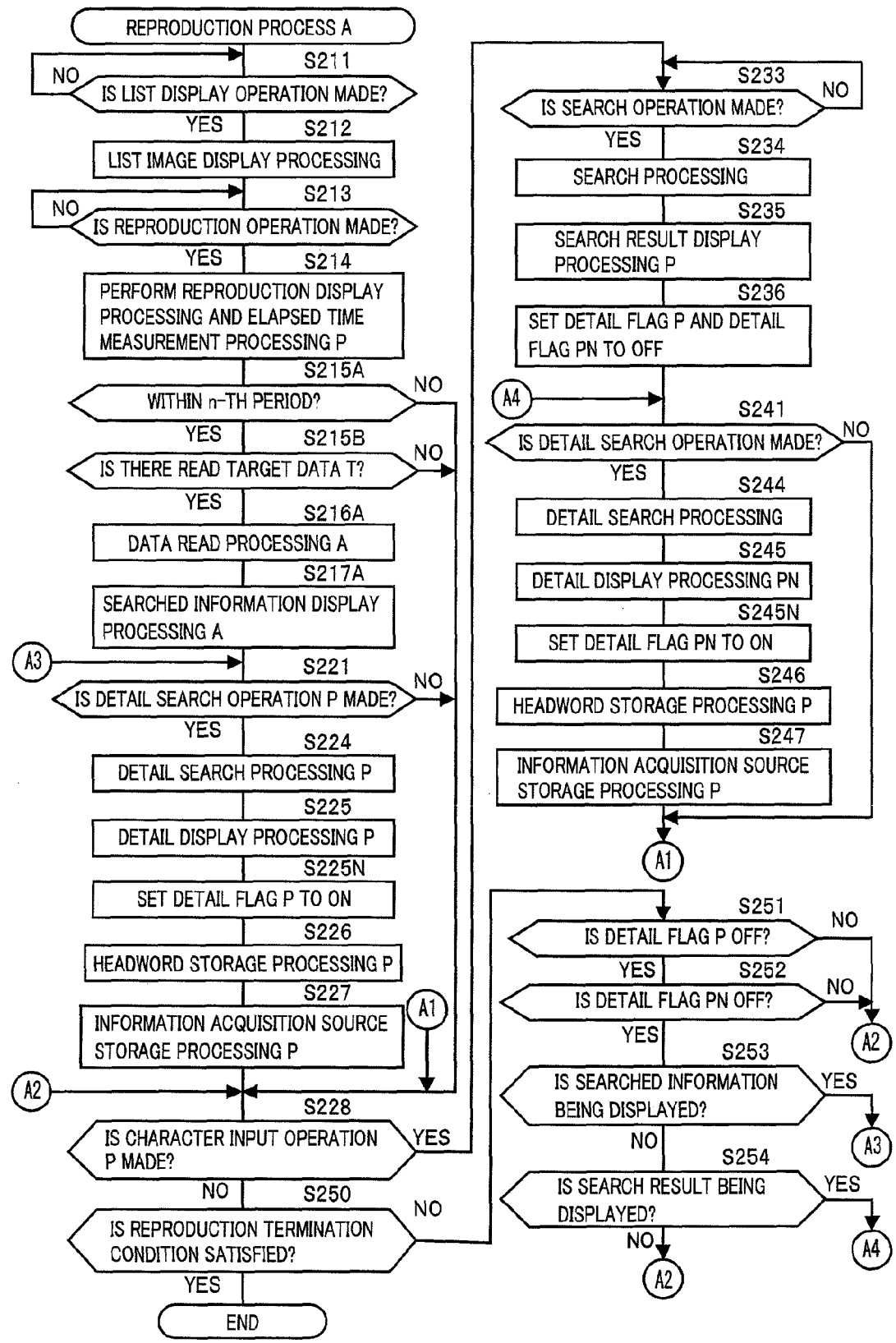
FIG. 25 is a view showing a flowchart of a reproduction process A.

FIG. 25 is a view showing a flowchart of reproduction process A. In reproduction process A, processing with a step number identical to that in the reproduction process of FIG. 12 provides the same processing as that described in FIG. 12, and thus detailed description will not be repeated. Hereinafter, description will be given mainly of processing different from the processing in FIG. 12.

Referring to FIG. 25, it is assumed that the image-recorded content titled "English Conversation Course AA" is reproduced by the processing in steps S211, S212, and S213. After the processing in step S214, control unit 510 advances the process to step S215A.

In step S215A, control unit 510 determines whether or not elapsed time being measured by elapsed time measurement processing P (hereinafter also referred to as measured elapsed time) is time within an n-th period. If YES in step S215A, control unit 510 advances the process to step S215B. If NO in step S215A, control unit 510 advances the process to step S228.

Here, n varies depending on the measured elapsed time. If the measured elapsed time is time within the first period described above, n is "1". That is, if the measured elapsed time is time within the period until "10 minutes 00 seconds" have elapsed since the start of the reproduction of the image-recorded content, n is "1". Similarly, if the measured elapsed time is time within the second period described above, n is "2". That is, if the measured elapsed time is time within the period from the time at which "10 minutes 01 seconds" have elapsed since the start of the reproduction of the image-recorded content to the time at which "20 minutes 00 seconds" have elapsed since the start of the reproduction of the image-recorded content, n is "2".

It is herein assumed that the measured elapsed time is, as an example, "2 minutes 00 seconds". In this case, control unit 510 determines whether or not the measured elapsed time is time within the first period. In this case, determination as YES is made in step S215A, and control unit 510 advances the process to step S215B. It is to be noted that the first period is a period including the searched information display time "8 minutes 22 seconds" indicated in headword-related data D100C in FIG. 19.

In step S215B, control unit 510 determines whether or not read target data T is stored in storage unit 520. Here, read target data T is headword-related data indicating the title of the image-recorded content being reproduced by the reproduction display processing, and is also headword-related data indicating searched information display time included in the n-th period. If YES in step S215B, control unit 510 advances the process to step S216A. If NO in step S215B, control unit 510 advances the process to step S228.

It is herein assumed that the n-th period is the first period. In this case, headword-related data D100C in FIG. 19 indicating the searched information display time "8 minutes 22 seconds" stored in storage unit 520 serves as read target data T. In this case, determination as YES is made in step S215B, and control unit 510 advances the process to step S216A.

In step S216A, data read processing A is performed. In data read processing A, control unit 510 reads read target data T from storage unit 520. It is herein assumed that read target data T is headword-related data D100C. Therefore, headword-related data D100C is read. Then, control unit 510 advances the process to step S217A.

In step S217A, searched information display processing A is performed. Searched information display processing A is processing for displaying searched information T. Here, searched information T is information searched for in the n-th period of the image-recording period described above or the reproduction period described above.

Specifically, in searched information display processing A, control unit 510 generates a searched information display image utilizing VDP 532, based on the headword-related data read by the processing in step S216A, and causes display unit 530 to display the generated searched information display image together with the reproduced image. The searched information display image is an image displaying a headword corresponding to the searched information display time included in the n-th period and information of an information acquisition source for the headword indicated in the read headword-related data.

It is herein assumed that the headword-related data is headword-related data D100C as read target data T, and that the n-th period is the first period described above. In this case, the searched information display image is a searched information display image MG260T described below. In this case, display unit 530 displays an image at the time of reproduction MG200T described below in which searched information display image MG260T described below is displayed in addition to the reproduced image. Then, the processing in step S217A is terminated.

Figure 26:
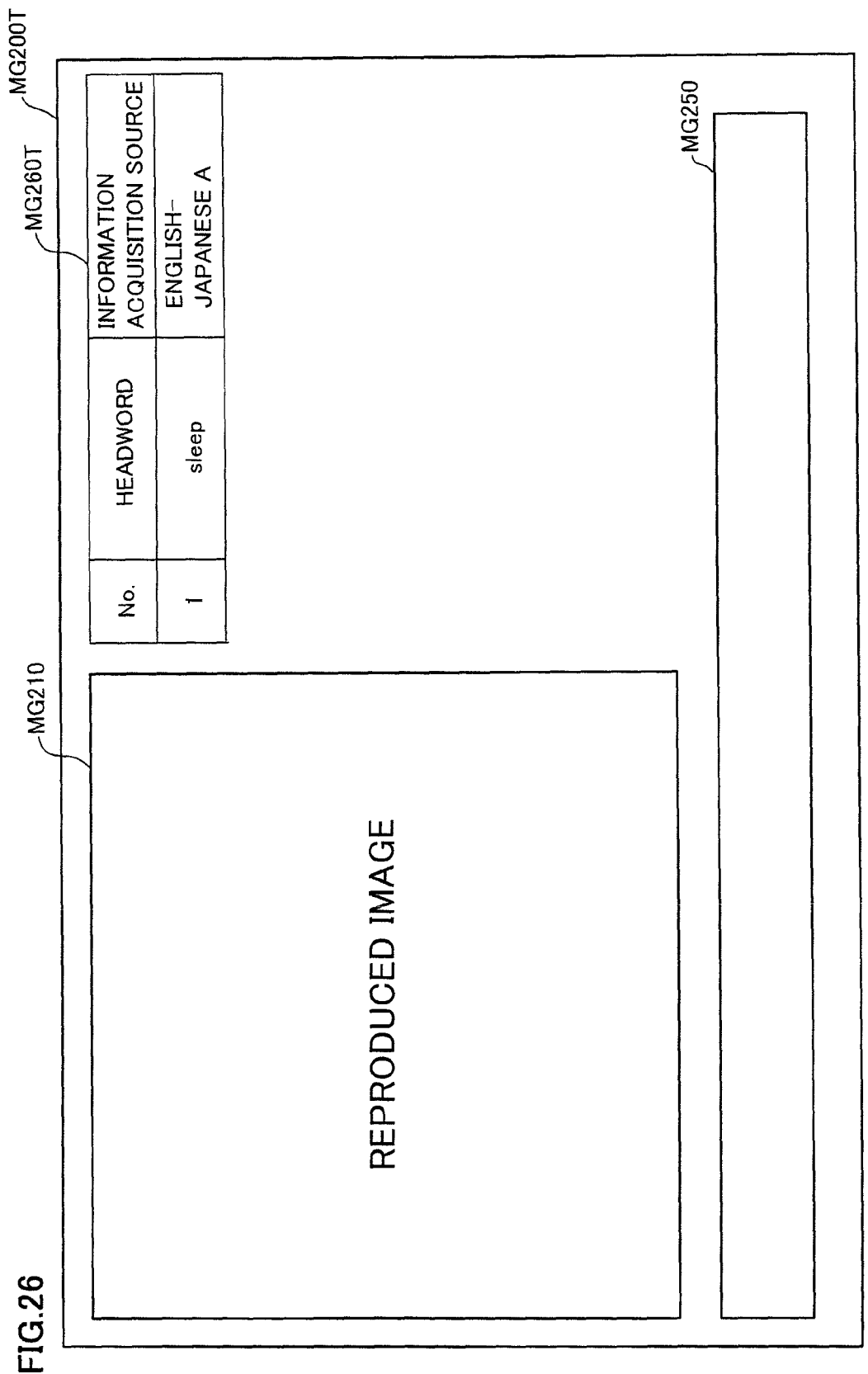
FIG. 26 is a view showing an image at the time of reproduction as an example.

FIG. 26 is a view showing image at the time of reproduction MG200T as an example. Referring to FIG. 26, when compared with image at the time of reproduction MG200A in FIG. 15, image at the time of reproduction MG200T is different in that searched information display image MG260T is arranged instead of searched information display image MG260. Since image at the time of reproduction MG200T is otherwise the same as image at the time of reproduction MG200A, detailed description will not be repeated.

Searched information display image MG260T displays searched information data. In searched information display image MG260T, the "No." represents a number for identifying searched information data. The searched information data displayed in searched information display image MG260T includes the headword "sleep" corresponding to the searched information display time "8 minutes 22 seconds" included in the first period, and an information acquisition source corresponding to the headword. As described above, the information acquisition source is information for identifying a source for acquiring the detailed information.

It is to be noted that the searched information data displayed in searched information display image MG260T can be selected by an operation of depressing a numeric button included in button group 542.

Referring to FIG. 25 again, after the processing in step S217A, control unit 510 advances the process to step S221.

Since processing in step S221 and the subsequent steps is the same as the processing described in the first embodiment, detailed description will not be repeated.

If the measured elapsed time is, for example, "10 minutes 01 seconds" at a time point when the processing in step S215A is performed, display unit 530 displays a searched information display image displaying the headword "come" corresponding to searched information display time "16 minutes 50 seconds" included in the second period and information of an information acquisition source for the headword "come" indicated in headword-related data D100C, by the processing in steps S215A, S215B, S216A, and S217A.

The processing for displaying, based on measured elapsed time, a corresponding headword and information of an information acquisition source for the headword is not limited to the processing described above in the present embodiment. For example, if measured elapsed time reaches searched information display time corresponding to a headword, the headword and information of an information acquisition source for the headword may be displayed. Further, for example, if measured elapsed time reaches time that is a predetermined time (for example, one minute) earlier than searched information display time corresponding to a headword, the headword and information of an information acquisition source for the headword may be displayed.

As has been described above, in the present embodiment, when measured elapsed time being measured by elapsed time measurement processing P reaches time satisfying a predetermined time condition, a headword associated with the title of an image-recorded content being reproduced and also associated with searched information display time within the n-th period, and an information acquisition source corresponding to the headword are displayed on display unit 530, together with a reproduced image. Here, the time satisfying a predetermined time condition is time within the n-th period including the searched information display time indicated in the headword-related data as read target data T stored in storage unit 520.

That is, during the reproduction period of an image-recorded content, only within a predetermined period including searched information display time of a headword whose detailed information has been searched for and displayed in at least one of the image-recording period and the reproduction period of the image-recorded content, only the headword corresponding to the searched information display time is displayed. In other words, the headword is displayed at time close to time when the detailed information of the headword has been displayed. The displayed headword is a headword based on an interface operation by the user.

Therefore, in the present embodiment, the user can confirm only the headword whose detailed information has been searched for, more easily than in the first embodiment. The headword whose detailed information has been searched for is a headword based on an interface operation by the user, and a word to be learned by the user. Consequently, there is achieved an effect that can help the user efficiently learn a word to be learned.

(Functional Block Diagram)

Figure 27:
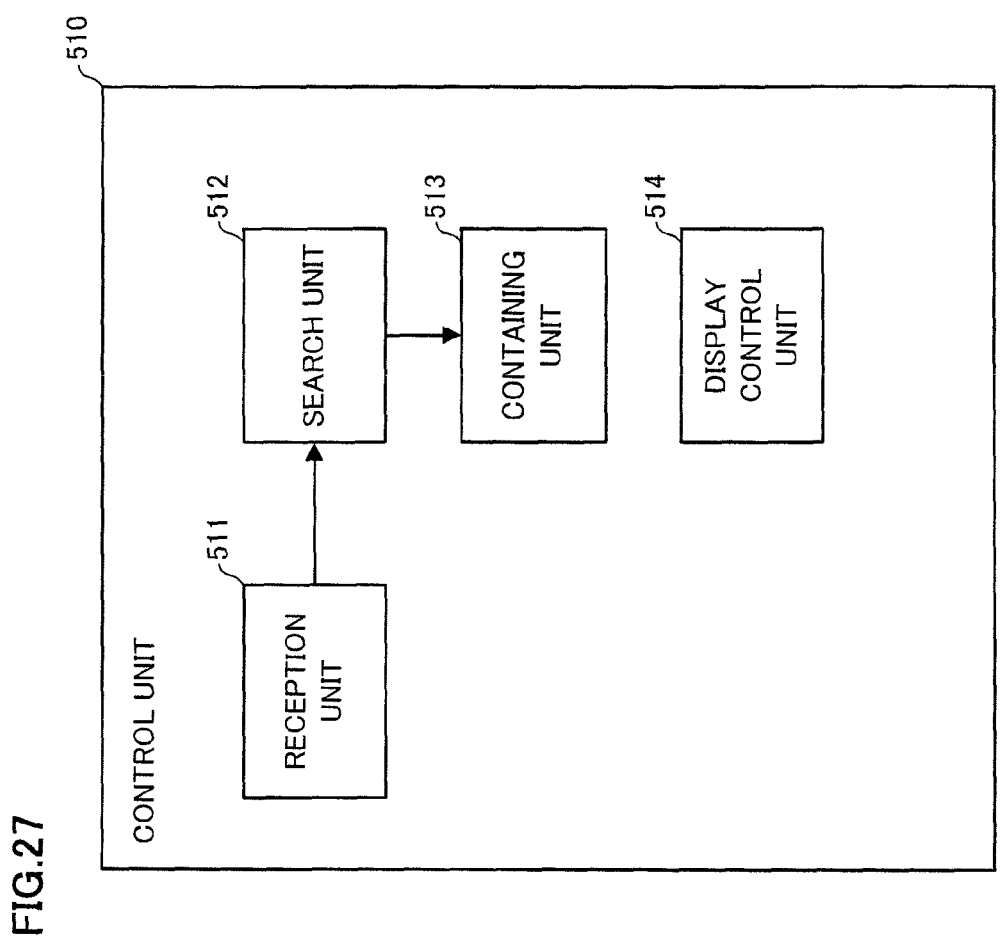
FIG. 27 is a functional block diagram of a control unit in a first embodiment and a second embodiment.

FIG. 27 is a functional block diagram of control unit 510 in the first embodiment and the second embodiment. Referring to FIG. 27, control unit 510 includes a reception unit 511, a search unit 512, a containing unit 513, and a display control unit 514.

Reception unit 511 receives an input. Search unit 512 performs search processing for searching for detailed information of a headword based on the input received by reception unit 511. Containing unit 513 performs storage processing if the search processing is performed by search unit 512 while display unit 530 is displaying an image, the storage processing causing storage unit 520 to store the headword corresponding to the detailed information searched for by the search processing and image information identifying the image being displayed by display unit 530 in an associated manner.

Display control unit 514 causes display unit 530, when display unit 530 displays the image identified by the image information stored in storage unit 520, to further display the headword associated with the image information.

A part or all of reception unit 511, search unit 512, containing unit 513, and display control unit 514 included in control unit 510 may be configured by hardware.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. An electronic device, comprising:
   a reception unit receiving an input;
   a search unit performing search processing for searching for detailed information of a headword based on said input received by said reception unit;
   a display unit displaying a moving image;
   a timer tracking elapsed time from a start of the moving image being displayed by the display unit, said timer recording a searched information display time which is related to the elapsed time and a time at which said search unit starts performing the search processing;
   a storage unit storing information;
   a containing unit performing storage processing responsive to said search processing being performed by said search unit while said display unit displays the moving image, said storage processing causing said storage unit to store the headword corresponding to the detailed information searched for by said search processing, image information identifying the moving image being displayed by said display unit, and the searched information display time in an associated manner; and
   a display control unit causing said display unit, when said display unit displays the moving image identified by said image information stored in said storage unit, to further display the headword associated with said image information.

2. The electronic device according to claim 1, wherein
   said storage unit stores a plurality of detailed information respectively associated with a plurality of headwords, and
   said search unit searches said plurality of detailed information stored in said storage unit for the detailed information associated with the headword based on said input received by said reception unit.

3. The electronic device according to claim 1, further comprising a communication unit performing data communication with a network, wherein
   said search unit searches said network for the detailed information of the headword based on said input received by said reception unit, utilizing said communication unit.

4. The electronic device according to claim 1, wherein
   said display control unit causes said display unit to display the detailed information searched for by said search processing,
   the electronic device further comprises a measurement unit measuring, when said display unit displays the image identified by said image information stored in said storage unit, elapsed time that has elapsed since said display unit displays the image identified by said image information, and
   if the elapsed time being measured by said measurement unit reaches time satisfying a predetermined time condition, said display control unit causes said display unit to display the headword associated with said image information.

5. The electronic device according to claim 4, wherein said time satisfying a predetermined time condition is time within a predetermined period including said searched information display time stored in said storage unit.

6. The electronic device according to claim 1, wherein, when causing said display unit to display the headword, said display control unit also causes said display unit to display information for identifying a source for acquiring the detailed information of the headword caused to be displayed on said display unit.

7. The electronic device according to claim 1, wherein the searched information display time is a time at which the detailed information is displayed.

8. The electronic device according to claim 1,
   wherein the detailed information searched for by said search processing is any of meaning, explanation, and a translated word of the corresponding headword;
   said display control unit causing said display unit to further display the detailed information of the headword when the display unit displays the moving image identified by said image information.

9. A non-transitory computer-readable recording medium recording a control program for an electronic device,
   said electronic device including a display unit displaying a moving image and a storage unit storing information,
   said control program causing said electronic device to perform the steps of:
   receiving an input;
   performing search processing for searching for detailed information of a headword based on said received input;
   displaying the moving image on the display unit;
   tracking elapsed time from a start of the moving image being displayed and recording a searched information display time which is related to the elapsed and a time at which the search processing is started;
   performing storage processing responsive to said search processing being performed while said display unit is displaying the moving image, said storage processing causing said storage unit to store the headword corresponding to the detailed information searched for by said search processing image information identifying the moving image being displayed by said display unit and the searched information display time in an associated manner; and causing said display unit, when said display unit displays the moving image identified by said image information stored in said storage unit, to further display the headword associated with said image information.

10. A control method for an electronic device including a display unit displaying a moving image and a storage unit storing information, comprising the steps of:
- receiving an input;
- performing search processing for searching for detailed information of a headword based on said received input;
- displaying the moving image on the display unit;
- tracking elapsed time from a start of the moving image being displayed and recording a searched information display time which is related to the elapsed and a time at which the search processing is started;
- performing storage processing responsive to said search processing being performed while said display unit is displaying the moving image, said storage processing causing said storage unit to store the headword corresponding to the detailed information searched for by said search processing image information identifying the moving image being displayed by said display unit and the searched information display time in an associated manner; and
- causing said display unit, when said display unit displays the moving image identified by said image information stored in said storage unit, to further display the headword associated with said image information.

* * * * *